United States Patent
Panjwani et al.

(10) Patent No.: US 8,542,926 B2
(45) Date of Patent: Sep. 24, 2013

(54) SCRIPT-AGNOSTIC TEXT REFLOW FOR DOCUMENT IMAGES

(75) Inventors: Saurabh Panjwani, Bangalore (IN); Abhinav Uppal, Punjab (IN)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 12/950,598

(22) Filed: Nov. 19, 2010

(65) Prior Publication Data
US 2012/0128249 A1    May 24, 2012

(51) Int. Cl.
*G06K 9/34* (2006.01)

(52) U.S. Cl.
USPC .......................................................... 382/176

(58) Field of Classification Search
None
See application file for complete search history.

(56) References Cited

U.S. PATENT DOCUMENTS

| | | | |
|---|---|---|---|
| 7,205,985 B2 * | 4/2007 | Dodge et al. | 345/179 |
| 7,616,815 B2 | 11/2009 | Berkner et al. | |
| 7,715,635 B1 | 5/2010 | Shagam et al. | |
| 2004/0205568 A1 | 10/2004 | Breuel et al. | |
| 2007/0234203 A1 | 10/2007 | Shagam et al. | |
| 2011/0305387 A1 * | 12/2011 | Al-Omari et al. | 382/165 |

OTHER PUBLICATIONS

Breuel, T.M.; Janssen, W.C.; Popat, K.; Baird, H.S., "Paper to PDA," Pattern Recognition, 2002. Proceedings. 16th International Conference on , vol. 1, No., pp. 476,479 vol. 1, 2002.*

Yasmin, T., S. Chaudhury, R. Jain, Transcoding of document images for mobile devices, pp. 516-521, Proc. of the Fourth Indian Conf. on Comp. Vision, Graphics & Image Processing, Dec. 16-18, 2004, Kolkata, India.
Breuel, T. M., W. C. Janssen, K. Popat, H. S. Baird, Paper to PDA, pp. 476-479, IEEE Computer Society 16th Int'l Conf. on Pattern Recognition, Aug. 11-15, 2002, Quebec, Canada.
Berkner, K. E. L. Schwartz, C. Marle, SmartNails: Display- and image-dependent thumbnails, SPIE Proceedings Document Recognition and Retrieval XI, Jan. 18-22, 2004, pp. 54-65, San Jose, California, USA.
Breuel, T. M., W. C. Janssen, K. Popat, H. S. Baird, Reflowable document image, Web Document Analysis, Challenges and Opportunities, Nov. 18, 2002, chapter 1, pp. 81-94.
Breuel, T. M., Two geometric algorithms for layout analysis, Proc. Of the 5th Int'l Workshop on Document Analysis Systems V, Aug. 19-21, 2002, pp. 188-199, Princeton, NJ, USA.
Breuel, T. M., Reflowable document images for the web, Proc. of the 2nd Int'l Workshop on Web Document Analysis, Aug. 3, 2003, pp. 21-24.
Dasigi, P., R. Jain, C. V. Jawahar, Document image segmentation as a spectral partitioning problem, Proc. of the 2008 Sixth Indian Conf. on Comp. Vision, Graphics and Image Processing, Dec. 16-19, 2008, pp. 305-312.

(Continued)

*Primary Examiner* — Claire X Wang
*Assistant Examiner* — Thomas A James
(74) *Attorney, Agent, or Firm* — Lyon & Harr, LLP; Richard T. Lyon

(57) ABSTRACT

Script-agnostic text reflow technique embodiments are presented that generally reflow text found in an image of a document in a manner that functions across multiple scripts, multiple fonts of a script and multiple languages using the same script. This generally involves segmenting regions of text in a document image into individual words and doing this without relying on any script-specific characteristics or requiring any form of character recognition. While segmenting text, the possible presence of accents, diacritics and punctuation marks is considered.

20 Claims, 18 Drawing Sheets

(56) References Cited

OTHER PUBLICATIONS

Ittner, D. J., H. S. Baird, Language-free layout analysis, Proc. of the Second Int'l Conf. on Document Analysis and Recognition, Oct. 22-23, 1993, pp. 336-340.

Muter, P., Interface design and optimization of reading of continuous text, Cognitive aspects of electronic text processing, 1996, pp. 161-180, Ablex Publishing Corp.

Nagy, G., S. C. Seth, M. Viswanathan, A prototype document image analysis system for technical journals, IEEE Computer, Jul. 1992, vol. 25, No. 7, pp. 10-22.

Öquist, G., K. Lundin, Eye movement study of reading text on a mobile phone using paging, scrolling, leading, and RSVP, Proc. of the 6th Int'l Conf. on Mobile and Ubiquitous Multimedia, Dec. 12-14, 2007, pp. 176-183, Oulu, Finland.

Cerience Corporation, Repligo Reader, retrieved Aug. 23, 211, http://www.cerience.com/products/reader, pp. 1-2.

* cited by examiner

SCRIPT-AGNOSTIC TEXT REFLOW FOR DOCUMENT IMAGES

BACKGROUND

Electronic documents can often only be viewed as images, and access to the underlying raw text is either difficult or infeasible. One example is reading books from digital libraries. Another example is viewing a digital presentation made using a document camera or a similar presentation system.

Further, these text-containing document images are often viewed on small screens (like screens of PDAs, mobile phones, and so on) or on shared displays (like on a projector screen in a classroom setting). This viewing can entail having to zoom into the image to make the text large enough to be readable. Zooming into blocks of text in a document image spreads the text equally in all directions and could result in the text boundaries expanding beyond the viewable area of the screen. The user would then have to use interactions like scrolling and panning to read the text.

Automated reflow of text in document images can greatly enhance the readability of such text when viewed on small screens or on shared displays, and is typically preferred by users over navigating horizontal pan/scroll interfaces. Text reflow allows users to enlarge text in a way that whenever the line width of the text exceeds the width of the screen, the text gets "wrapped around", i.e., for each line, the trailing word or words on that line are moved to the beginning of the succeeding line.

SUMMARY

The script-agnostic text reflow technique embodiments described herein generally provide for reflowing a binarized region of text from a document image into a specified-width display area on an electronic display in a script-agnostic manner. This script agnostic manner means that the text is segmented and reflowed without relying on any script-specific characteristics or requiring any form of character recognition. In fact, in most cases, it is not even necessary to know what type of script is being reflowed.

In one general implementation, the foregoing is accomplished by first segmenting a text region from the document image into candidate lines of text. Some candidate text lines may have been mis-identified and are actually noise. If so, the candidate designation is removed from these noise lines. In addition, the candidate text lines may include lines that have been identified as separate text lines, but which are actually lines made up of accent or diacritics marks that relate to the line of text above or below. As such, those candidate text lines made up of substantially only accent or diacritic marks, or both, are merged into the closest adjacent candidate text line. Each remaining candidate text line is designated as a final text line.

Next, each of the final text lines is segmented into candidate text words. However, there may be inter-word punctuation and diacritic marks that should be associated with a word of text rather than to stand alone. In addition, there can be inter-word noise that could be mis-identified as a text word. As such, the candidate status of candidate text words that are attributable to noise rather than text is removed, and inter-word punctuation and diacritic marks, if any, are identified and merged into the closest adjacent candidate text word. Final text words are then designated for each final text line based on the remaining candidate text words in that line.

Once the final text words have been designated, the final text lines are segmented into paragraphs. This is done because text reflowing is done on a paragraph by paragraph basis. As such, for each paragraph, the final text words found therein are reflowed so as to fit into the aforementioned specified-width display area while maintaining the original sequential order of the words.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of script-agnostic text reflow technique embodiments reference is made to the accompanying drawings which form a part hereof, and in which are shown, by way of illustration, specific implementations in which the technique may be practiced. It is understood that other embodiments may be utilized and structural changes may be made without departing from the scope of the technique.

1.0 Script-Agnostic Text Reflow Technique

The script-agnostic text reflow technique embodiments described herein generally reflow text found in an image of a document in a manner that functions across multiple scripts, multiple fonts of a script and multiple languages using the same script. This generally involves segmenting regions of text in a document image into individual words and doing this without relying on any script-specific characteristics or requiring any form of character recognition. While segmenting text, the possible presence of accents, diacritics and punctuation marks is considered. In addition, some amount of variability in inter-word and intra-word spacing is tolerated, as well as handling scripts exhibiting no intra-word spacing.

Figure 1:
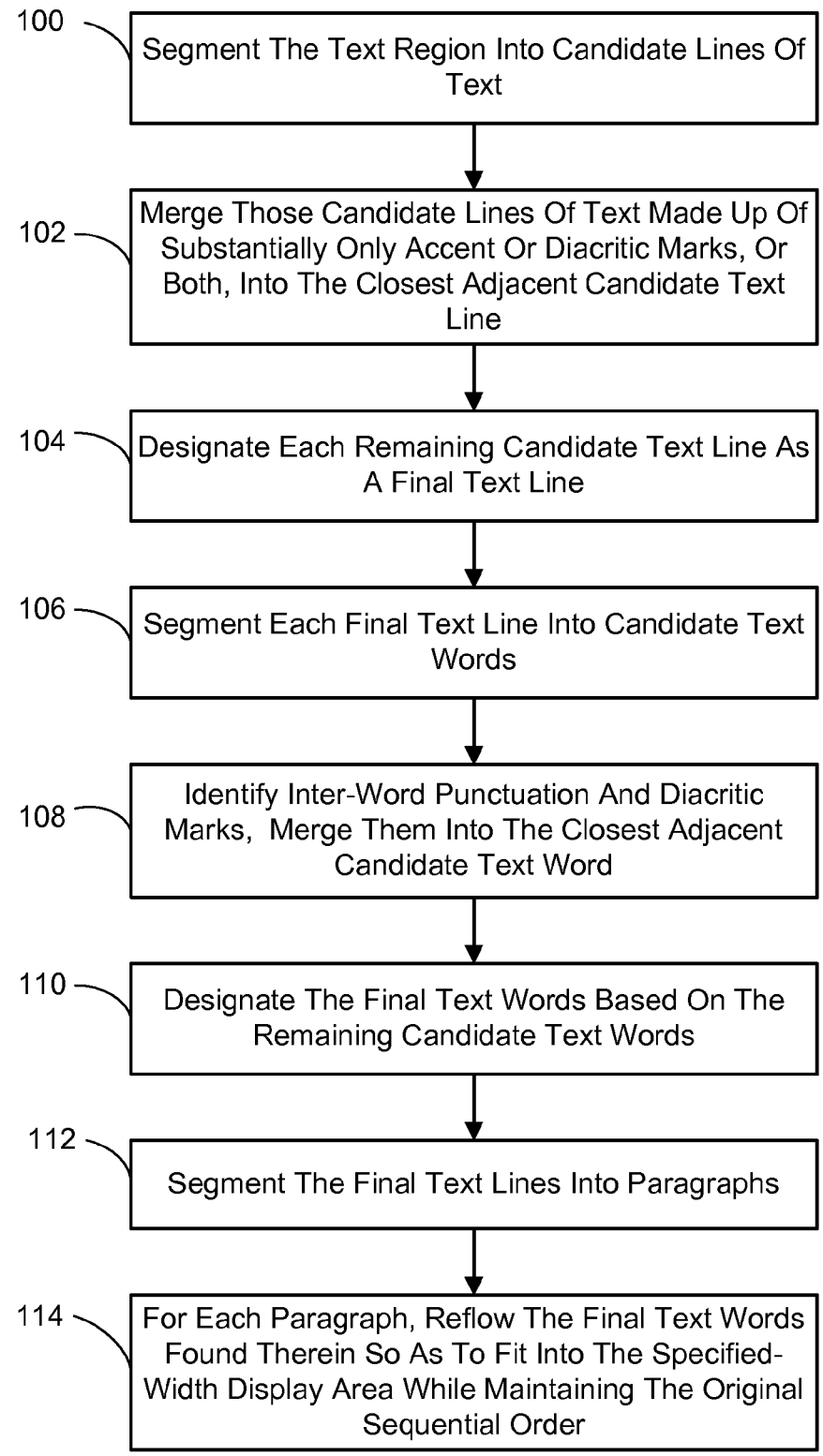
FIG. 1 is a flow diagram generally outlining one embodiment of a process for reflowing a binarized region of text from a document image into a specified-width display area on an electronic display in a script-agnostic manner.

More particularly, referring to FIG. 1, in one general implementation a binarized region of text from a document image is reflowed into a specified-width display area on an electronic display in a script-agnostic manner as follows. First, the text region is segmented into candidate lines of text (100), and then those candidate lines of text made up of substantially only accent or diacritic marks, or both, are merged into the closest adjacent candidate text line (102). Each remaining candidate text line is designated as a final text line (104). Next, each final text line is segmented into candidate text words (106). Inter-word punctuation and diacritic marks, if any, are then identified and merged into the closest adjacent candidate text word (108). The final text words are then designated based on the remaining candidate text words (110). In addition, the aforementioned final text lines are segmented into paragraphs (112). For each of these paragraphs, the final text words found therein are reflowed so as to fit into the aforementioned specified-width display area while maintaining their original sequential order (114).

In the foregoing procedure and the following description, the term binarized refers to a document image where each pixel has been converted into a black pixel or a white pixel, depending upon its luminosity. As a result, the black pixels represent text and the white pixels represent non-text areas, although as will be described later some non-text black pixel noise may be present. The term document image refers to a digital image created by converting any document—either digital or paper—into a standard digital format like bitmap. This includes images created by digitally scanning paper documents using a digital scanner or document camera. The term reflow refers to fitting a piece of text to a given rectangular screen area on an electronic display, while maintaining the sequential order of words that appear in the text, and while ensuring that the length of every line in the fitted text is the same or less than the width of the specified area. The term script-agnostic refers to not needing information about the particular script employed for the text to perform the segmentation and reflowing of the text. The term inter-word refers to a location between two words of text, which is in contrast to the term intra-word that refers to a location within a word. For example, inter-word spaces or punctuation refers to spaces or punctuation marks that appear between words of text, whereas an intra-word space refers to a space found within a word (such as the space between letters or characters in a word).

The script-agnostic text reflow technique embodiments described herein provide many advantages. For instance, the use of these technique embodiments can result in a simple user interface, such as a reflow-enabled reader that does not require parameter inputs from the user—not even the script name. The technique embodiments also rely on processing the text only as it is presented visually; no script-specific recognition of the text is needed. This makes these embodiments very efficient and applicable to multiple scripts, languages and font sizes. Still further, being script-agnostic, it addresses the case of multi-lingual text. The use of English words in non-Western text is prevalent practice, particularly in technical documents. English documents also sometimes include non-Latin script (e.g., language-learning books). Another example is Indian documents that use multiple Indian scripts.

The script-agnostic text reflow technique embodiments described herein can be employed in a variety of reflow applications. For example, the technique embodiments can be employed in a document image viewer designed for small screen devices to expand areas of text in a document image to a readable size, while reflowing the words to fit the expanded view. The technique embodiments can also be employed in an interface to enable users to zoom into or out of a document image while reflowing the text contained in it to fit the screen width, or in an interface to enable users to select rectangular regions of text in a document image and to resize these regions while reflowing the text therein to fit the resized boundaries. This last interface is particularly useful when presenting document images on a shared display (e.g., in a classroom) and when a part of the text in the document image needs to be highlighted. This highlighting would involve first selecting the text to be resized, then enlarging it proportionately in all directions, and then reflowing it to make it fit within the width of the shared display.

The script-agnostic text reflow technique embodiments described herein work best when the script being reflowed exhibits certain characteristics. These types of scripts will be referred to as segmentable scripts and generally exhibit the following qualities. First, they are written in straight horizontal lines, and are read (and so flow) either left-to-right or right-to-left. Lines of text are meant to be read top-to-bottom and are made up of words, which is the smallest semantic unit that can occur by itself visually in any text written using the script. In addition, the size of the font used in the text is nearly the same size for each region of text considered. Further, the ratio of the widths of intra-word spaces to the widths of inter-word spaces for any piece of text written in the script is at most $\alpha$ for some fixed value $\alpha$ (e.g., $\alpha$ is set to approximately 0.714 in one tested implementation which handles scripts of 4 languages—English, Hindi, Kannada and Arabic). The script may have diacritics, accents and punctuation marks which are disconnected from the words. However, if an accent or diacritic mark appears above or below a word, the ratio of the height of these entities to the height of the word they are associated with is at most β (where β<1) for some fixed value β (e.g., β is set to approximately 0.6 in one tested implementation). In addition, the vertical distance between the mark and the word it is associated with is less than the vertical distance between the mark and the nearest line of text that the mark is not associated with. Still further, for marks that appear between words in a line of text, the horizontal distance separating the mark and the word it is associated with, is less than the horizontal distance separating the mark and an adjacent word not associated with the mark. It is noted that in one implementation, the foregoing vertical and horizontal distances are measured by first drawing a bounding box around the word (or the entire line if the marks appear above or below the line) and another around the mark (or around all the marks that appear above or below a line of text) that is suspected of being associated with the word (or line), and then measuring the distance between the boundaries of the respective objects. Additionally, for any two adjacent lines, there is a horizontally-contiguous white space between them; and no substantial portion of a word, accent or diacritic can be contained in this space. It is noted however that as will be described shortly, in one implementation black pixel minimas are used to identify the spaces between lines of text and not absolute zeroes. As such, some amount of black pixel noise even between 2 adjacent lines can be tolerated. Further, the text can be separated into paragraphs, and if so every paragraph of text must begin on a new line, and the first word must be indented with a white space of a prescribed length (e.g. at least twice the size of the word height in the line). Many scripts, if not a majority of scripts in use, exhibit the foregoing characteristics. For instance, the Latin script employed for most Western languages exhibits the foregoing characteristics, as do many Indian language scripts.

1.1 Pre-Processing

Prior to segmenting a document image into lines of text, words and paragraphs, the document image is pre-processed so as to make it amenable to segmentation. In general, this involves binarizing the image as indicated previously and separating text regions from non-text regions in the document image. In addition, the pre-processing can optionally include actions like filtering out noise and correcting skew in of the image. These last actions are optional and can be excluded, for the sake of efficiency, especially if the document image has a suitably superior quality. It is noted that the foregoing pre-processing actions are standard procedures which can be implemented using various conventional document image analysis procedures. As such, no detailed description of these procedures will be provided herein.

Figure 2:
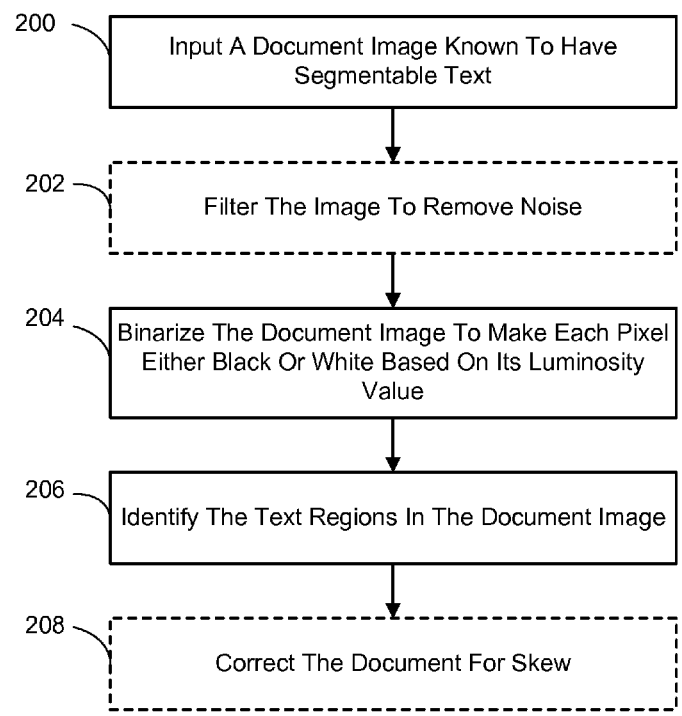
FIG. 2 is a flow diagram generally outlining one embodiment of a process for pre-processing a document image so as to make it amenable to segmentation.

In view of the foregoing, in one implementation exemplified in FIG. 2, pre-processing begins with inputting a document image known to have segmentable text as described previously (200). The image is optionally filtered to remove noise (202). As stated above, this action is contingent on the quality of the document image. If the image is relatively noise free, then this action can be skipped. It is noted that the contingent nature of this action is indicated in FIG. 2 by the dashed-line box. Next, the document image is binarized to make each pixel therein either black or white based on its luminosity value (204). More particularly, pixels having a luminosity value that exceeds a prescribed luminosity threshold are designated as white pixels, and those whose luminosity value falls below the threshold are designated as black pixels. The text regions are then identified in the document image (206), and the document is optionally corrected for skew contingent on the quality of the image (208). Here again if the image is relatively noise free, this last action can be skipped.

1.2 Segmentation

After pre-processing, each region of text found in the document image is segmented separately. This generally involves first segmenting each region into the lines of text, then segmenting each word in each line, and then segmenting the region into paragraphs. These tasks will be described in greater detail in the sections to follow.

It is noted that black pixel noise associated with stray dots introduced in the digitizing process in both the white spaces between lines of text and between words in a text line (and which may not have been removed during pre-processing), could adversely affect the segmentation process. To prevent this, the black pixel noise is identified and dealt with during the segmentation procedure. As will be seen this is possible because such black pixel noise is easily distinguishable from text. For example, in the case of inter-line black pixel noise (i.e., stray black pixels in the white space between lines of text), the height of noisy regions will typically be at most a small fraction (e.g., $1/10^{th}$) of the height of a typical line of text. Similarly, in the case of inter-word black pixel noise (i.e., stray black pixels in the white space between text words), the width of noisy regions will typically be at most a small fraction (e.g., $1/10^{th}$) of the average width of the words.

1.2.1 Line Segmentation

The text region being segmented is first broken up into lines of text. In one embodiment, this line segmentation is accomplished using a black pixel profiling technique. More particularly, the number of black pixels in each row of the underlying image are counted, and used to generate a horizontal black pixel profile, and then, in general, rows with greater number of black pixels are associated with text lines, while those with smaller densities are associated with the spaces between text lines.

However, the text region under consideration may include accents and diacritics. In general, accents and diacritics are marks used in a script that extend downwards or upwards from a text line. In terms of the black pixel profile, these accents and diacritics tend to look like black pixels in the white space between lines. This is not unlike inter-line black pixel noise, which also looks like black pixels in the white space between lines in the horizontal black pixel profile. As such, identifying text lines using the horizontal black pixel profile can result in lines of accents and/or diacritics, or black pixel noise, either being identified as a separate line of text, or cause two separate lines of text to look like a single line. In order to address this issue, one implementation of the line segmentation procedure identifies local black pixel minima rows in the horizontal black pixel profile rather than absolute zeroes. The minima rows are deemed to be line boundaries. This allows a comparison of the heights of resulting candidate lines that are flanked by these line boundaries (where the height of a line is defined as the shortest distance between the line boundaries). Lines associated with accents and diacritics will have a substantial height, but less than the average height of a text line in the text region under consideration (e.g., 60% of the average text line height). When such a line is identified using a height comparison, it is merged into the closest line of text. Black pixel noise lines typically exhibit a much smaller height than either text lines or accent-diacritic lines (e.g., 10% of the average text line height). Thus, it is possible to identify a noise line and ignore it by removing the line boundary designation from its flanking minima rows.

Unfortunately, minima rows do not always correspond to line boundaries—sometimes they could just be regions of reduced density within a text line. To avoid splitting a text line in the segmentation procedure, the identified local black pixel minima rows are filtered using a threshold which distinguishes intra-text line minima rows from minima rows associated with line boundaries (or false line boundaries in the case of accent and diacritic lines and noise lines). If the minima row exceeds the threshold, it is not considered a line boundary.

Figure 3:
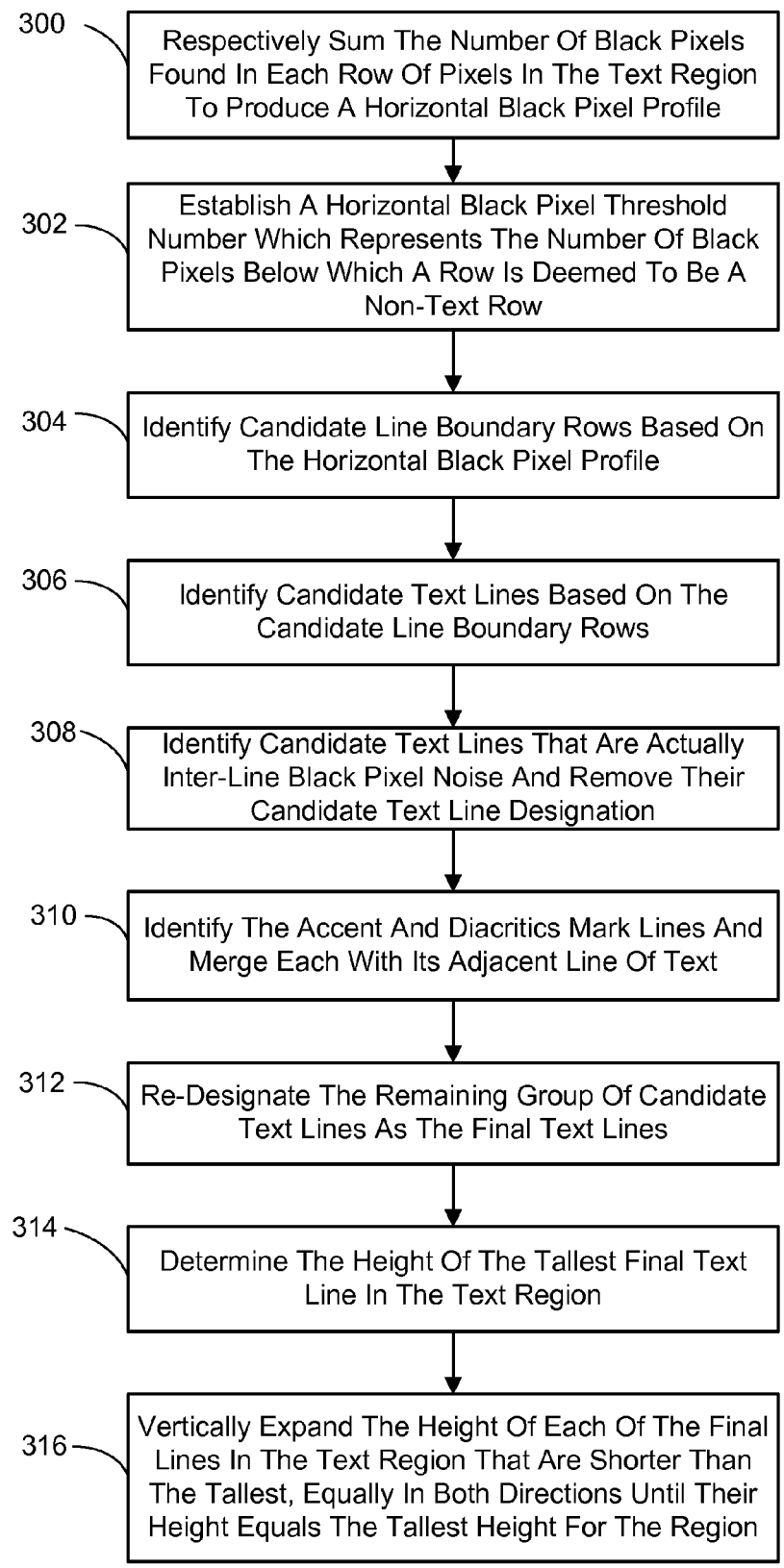
FIG. 3 is a flow diagram generally outlining one embodiment of a process for text line segmentation.

In one embodiment exemplified in FIG. 3, the foregoing line segmentation task is accomplished as follows for each text region identified in the pre-processing stage. First, the number of black pixels found in each row of pixels in the text region is respectively summed to produce a horizontal black pixel profile (300). Based on the results of the profiling, a horizontal black pixel threshold number is established, which represents the number of black pixels below which a row is deemed to be a non-text row (302). In one implementation, this is accomplished by setting the horizontal black pixel threshold number as a heuristically-determined fraction of the per-row average pixel density (e.g., in one tested implementation, the horizontal black pixel threshold number was set to 0.1). Next, candidate line boundary rows are identified based on the horizontal black pixel profile (304). In general, a candidate line boundary row is a row that is possibly either the first row or the last row in a set of consecutive rows that make up a line of text.

Figure 4:
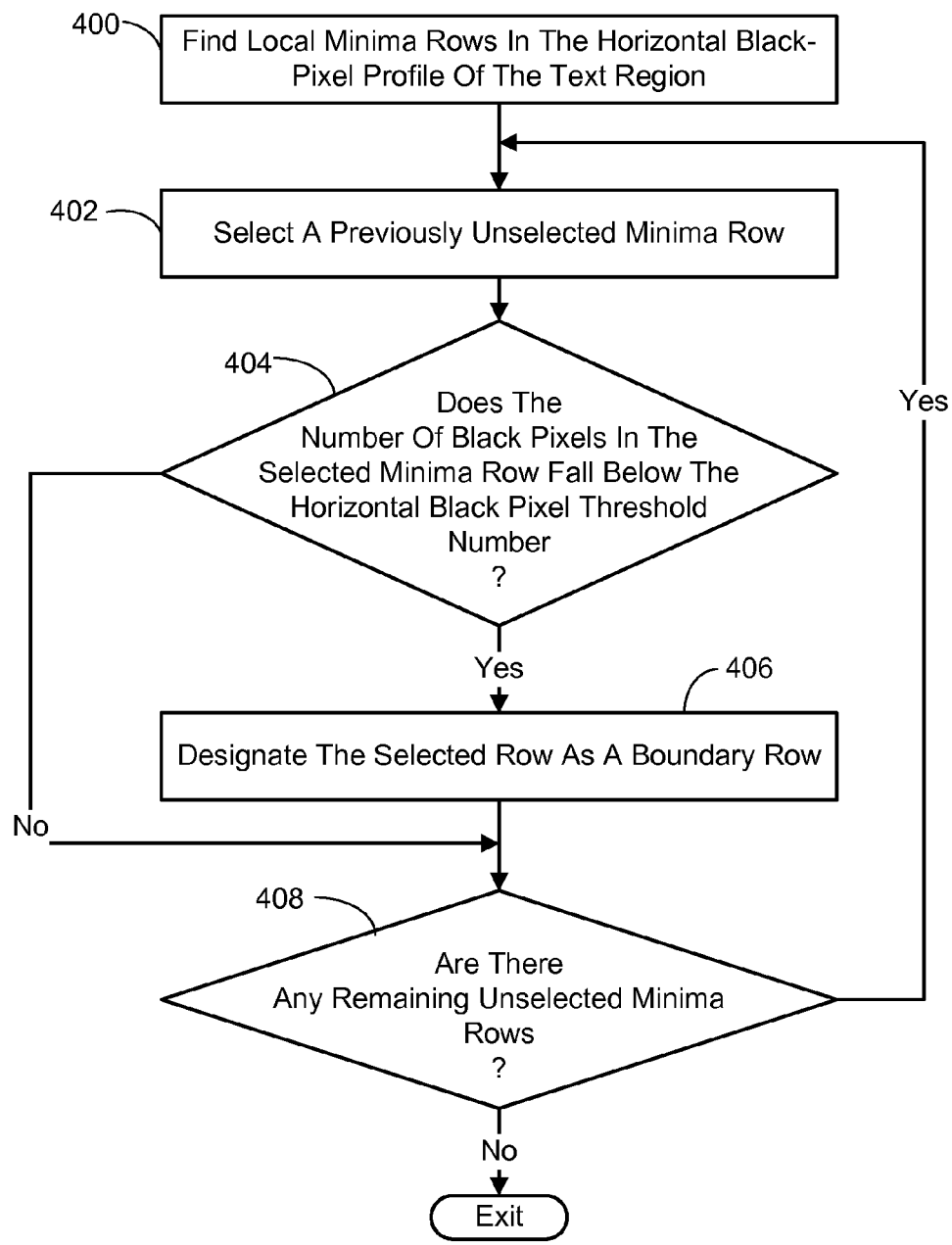
FIG. 4 is a flow diagram generally outlining an implementation of the part of the process of FIG. 3 involving the identification of candidate line boundary rows.

In one exemplary implementation shown in FIG. 4, identifying candidate line boundary rows is accomplished by first finding local minima rows in the horizontal black-pixel profile of the text region under consideration (400) and then selecting a previously unselected one of the discovered minima rows (402). It is then determined if the number of black pixels in the selected minima row falls below the horizontal black pixel threshold number (404). If so, the selected row is designating as a boundary row (406). If not, no action is taken. In either case, it is next determined if there are any remaining unselected minima rows (408). If so, actions 402 through 408 are repeated, until all the minima rows have been processed.

Referring again to FIG. 3, once the candidate line boundary rows have been identified, candidate text lines are identified based on the candidate line boundary rows (306). In general, a candidate text line is a set of consecutive rows of the document image bounded on the top and bottom respectively by a candidate line boundary row, and whose rows collectively exhibit a height and black pixel density indicative of text.

Figure 5:
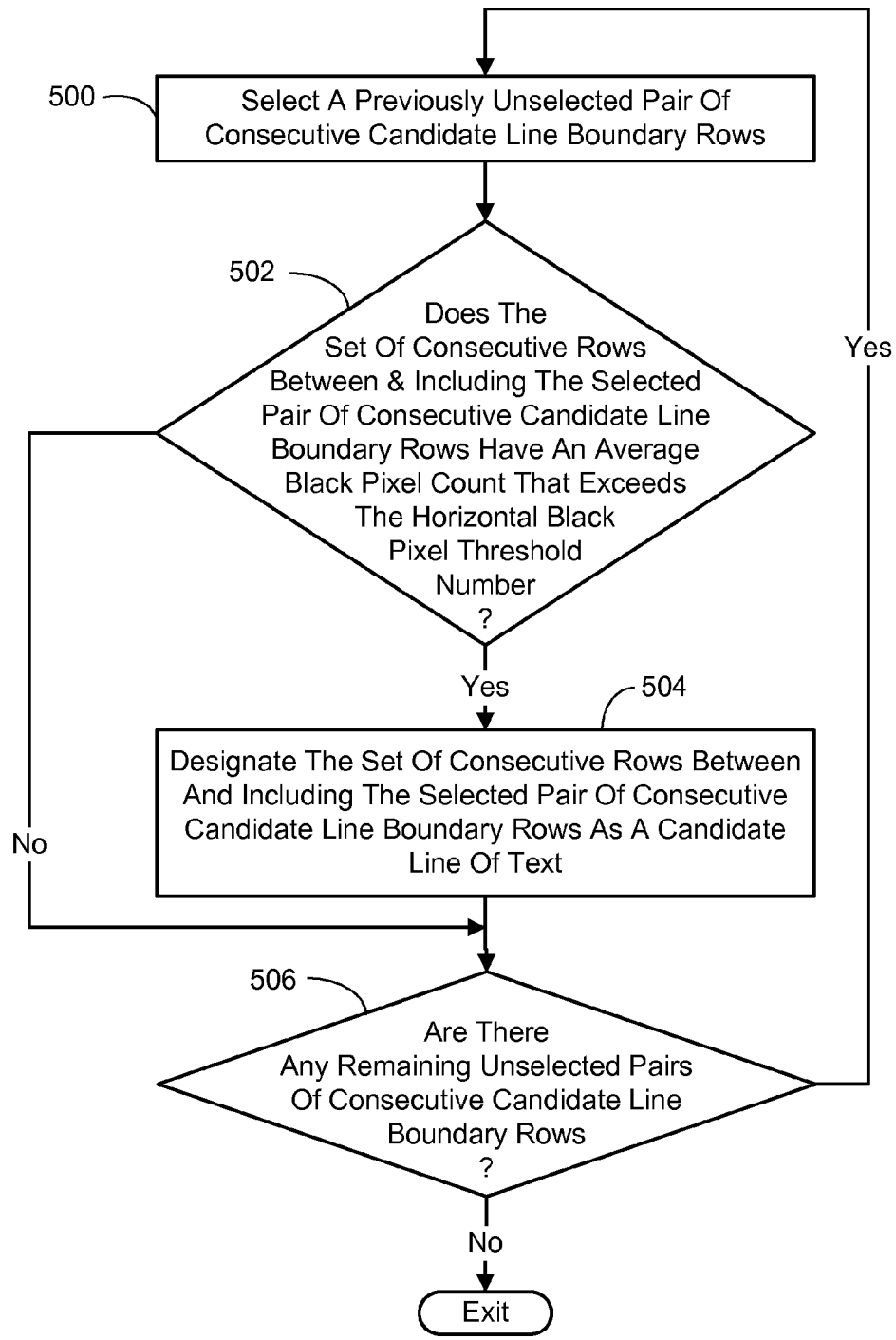
FIG. 5 is a flow diagram generally outlining an implementation of the part of the process of FIG. 3 involving the identification of candidate text lines.

In one exemplary implementation shown in FIG. 5, identifying candidate text lines is accomplished by first selecting a previously unselected pair of consecutive candidate line boundary rows (500). It is then determined if the set of consecutive rows between and including the selected pair of consecutive candidate line boundary rows has an average black pixel count that exceeds the previous mentioned horizontal black pixel threshold number (502). If so, then the set of consecutive rows between and including the selected pair of consecutive candidate line boundary rows is designated as a candidate line of text (504). If not, no action is taken. In either case, it is next determined if there are any remaining previously unselected pairs of consecutive candidate line boundary rows (506). If so, actions 500 through 506 are repeated, until all the pairs have been processed.

As indicated previously, some scripts have accent and diacritics marks that appear above or below a line of text. A set of pixel rows depicting these marks could be identified as a separate line of text in the preceding procedure. In addition, as described previously, noise between text lines (which appears as extraneous black pixels in the white space between lines of text) can rise to a level that a set of pixel rows that are supposed to be white space separating text lines, are instead identified as a line of text in the foregoing procedure. In general, these issues can be handled using line height (defined as the perpendicular distance between the candidate line boundary rows flanking a candidate text line) as a guide since both an accent-diacritic line and a noise line will be smaller than an actual text line. As such, referring again to FIG. 3, candidate text lines that are actually inter-line black pixel noise rather than text are then identified and their candidate text line designation is removed (308). Next, the accent and diacritics mark lines are identified and merged with their adjacent line of text (310). The foregoing actions result in a remaining group of candidate text lines, which are then re-designated as the final text lines for text region under consideration (312). It is noted that due to the possible merging of accents and diacritics into one or more of the final text lines, all the lines may not have the same height. Subsequent processing is facilitated if the line height in each text region considered is consistent. To this end, in one implementation as exemplified in FIGS. 3A-B, the height of the tallest final text line in the text region under consideration is determined (314), and the height of each of the final lines in the region that are shorter than the tallest, are "vertically" expanded equally in both directions until their height equals the determined tallest height for the region (316). For example, this can be accomplished by adding rows and designating the last added row in each direction as the new line boundary row for the expanded line. Further, in one implementation, the rows added above and below to the text line are made to have white pixels only. This is so even if the pixel row in the original document had black pixels. Thus, the rows which are added to text lines in the expansion are always fully white pixel rows.

Figure 6A:
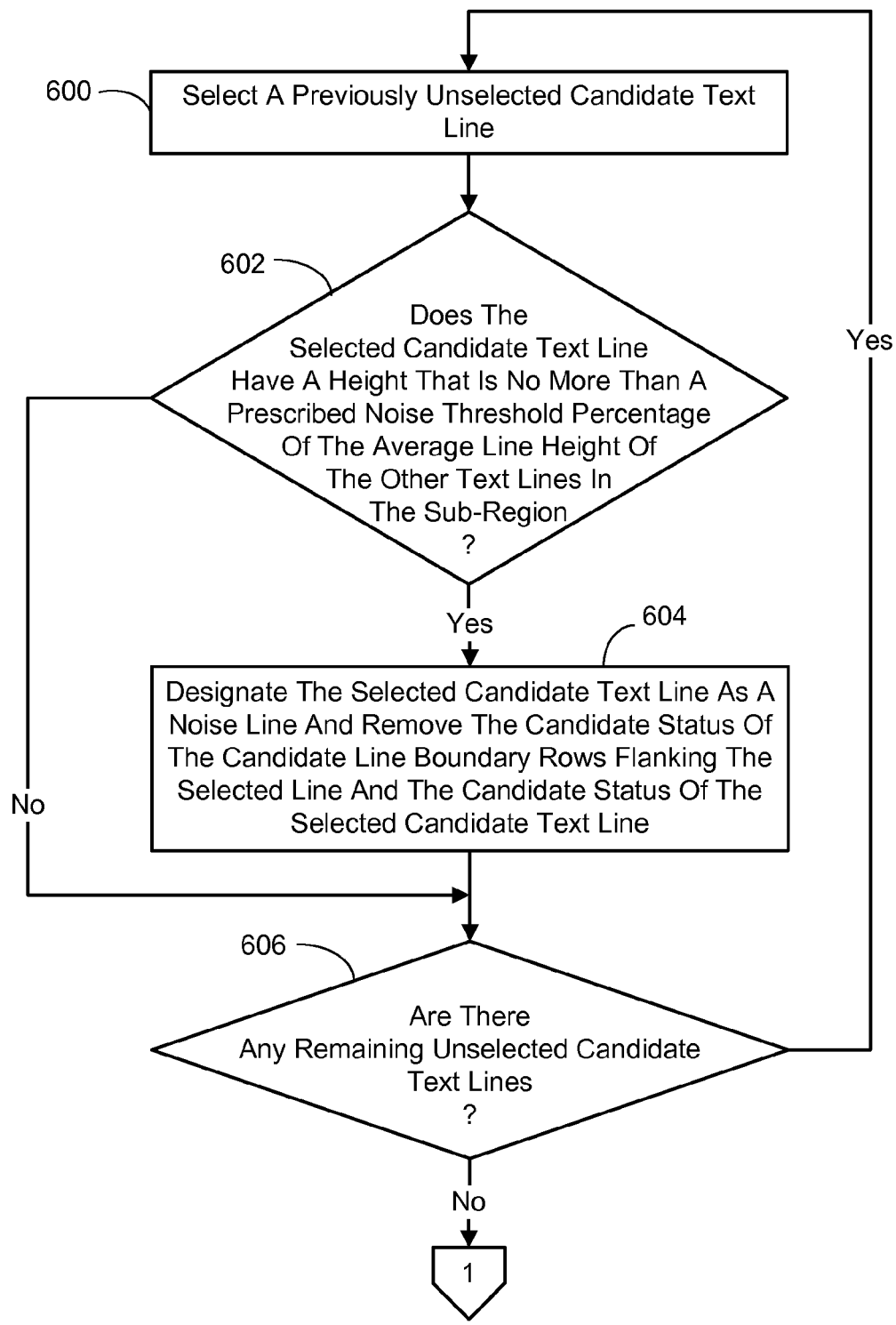
FIGS. 6A-B are a continuing flow diagram generally outlining an implementation of the part of the process of FIG. 3 involving identifying and merging accent and diacritics mark lines, as well as identifying and "de-designating" noise lines.
Figure 6B:
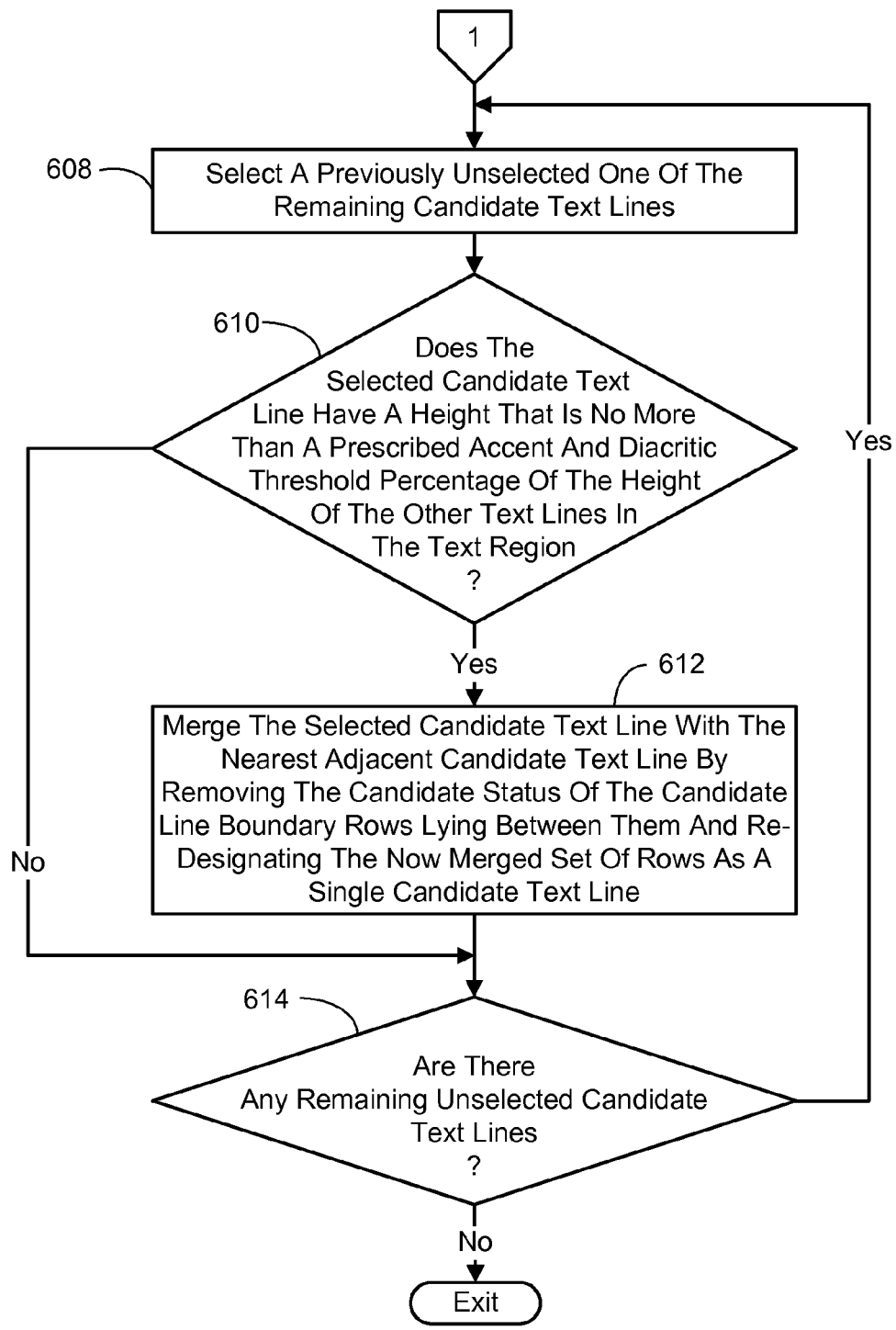

In one exemplary implementation shown in FIGS. 6A-B, the foregoing tasks of "de-designating" noise lines, as well as identifying and merging accent and diacritics mark lines, is accomplished as follows. First, a previously unselected candidate text line is selected (600). It is then determined if the selected candidate text line has a height that is no more than a prescribed noise threshold percentage of the average line height of the other text lines in the text region under consideration (602). If so, the selected candidate text line is designated as a noise line and the candidate status of the candidate line boundary rows flanking the selected line is removed and so is the candidate status of the selected candidate text line (604). If not, no action is taken. In either case, it is next determined if there are any remaining previously unselected candidate text lines (606). If so, actions 600 through 606 are repeated, until all the candidate text lines have been processed.

Referring again to FIGS. 6A-B, a previously unselected one of the remaining candidate text lines is selected (608), and it is determined if the selected text line has a height that is no more than a prescribed accent and diacritic threshold percentage of the height of the other text lines in the text region under consideration (610). If so, the selected candidate text line is merged with the nearest adjacent candidate text line (either above or below as the case may be) by removing the candidate status of the candidate line boundary rows lying between them and re-designating the now merged set of rows as a single candidate text line (612). If not, no action is taken. In either case, it is next determined if there are any remaining previously unselected candidate text lines (614). If so, actions 608 through 614 are repeated.

1.2.2 Word Segmentation

Once lines have been identified, each one is broken up into individual words. In general, this can be accomplished by considering vertical black pixel profiles of the pixel columns of each line. Regions whose profiles have black pixel densities are indicative of a word of text are identified using the vertical profile. In addition, inter-word punctuation and diacritic marks are identified and merged into the nearest word, and regions of inter-word black pixel noise are identified and eliminated from consideration as words or punctuation-diacritic marks.

However, care is taken to distinguish punctuation marks and diacritics from inter-word black pixel noise as they can look similar in the vertical black pixel profile. In one implementation, noise is distinguished by realizing that punctuation and diacritic marks are physically close to a word. As such, these marks can be identified based on the presence of black pixels in the neighborhood. Inter-word noise regions will typically have neighboring pixel columns exhibiting sparse black pixel density, whereas a punctuation or diacritic mark will have neighboring pixels on one side thereof that have high black pixel density. As will be described in more detail shortly, a "plateau" filter is employed to distinguish punctuation-diacritic marks from inter-word noise. In other words, the plateau filter ensures that black-pixel regions which occur without neighboring black-pixel regions are filtered away, while regions that do have such neighbors (e.g., diacritic and punctuation marks that occur close to words) are retained.

Figure 7A:
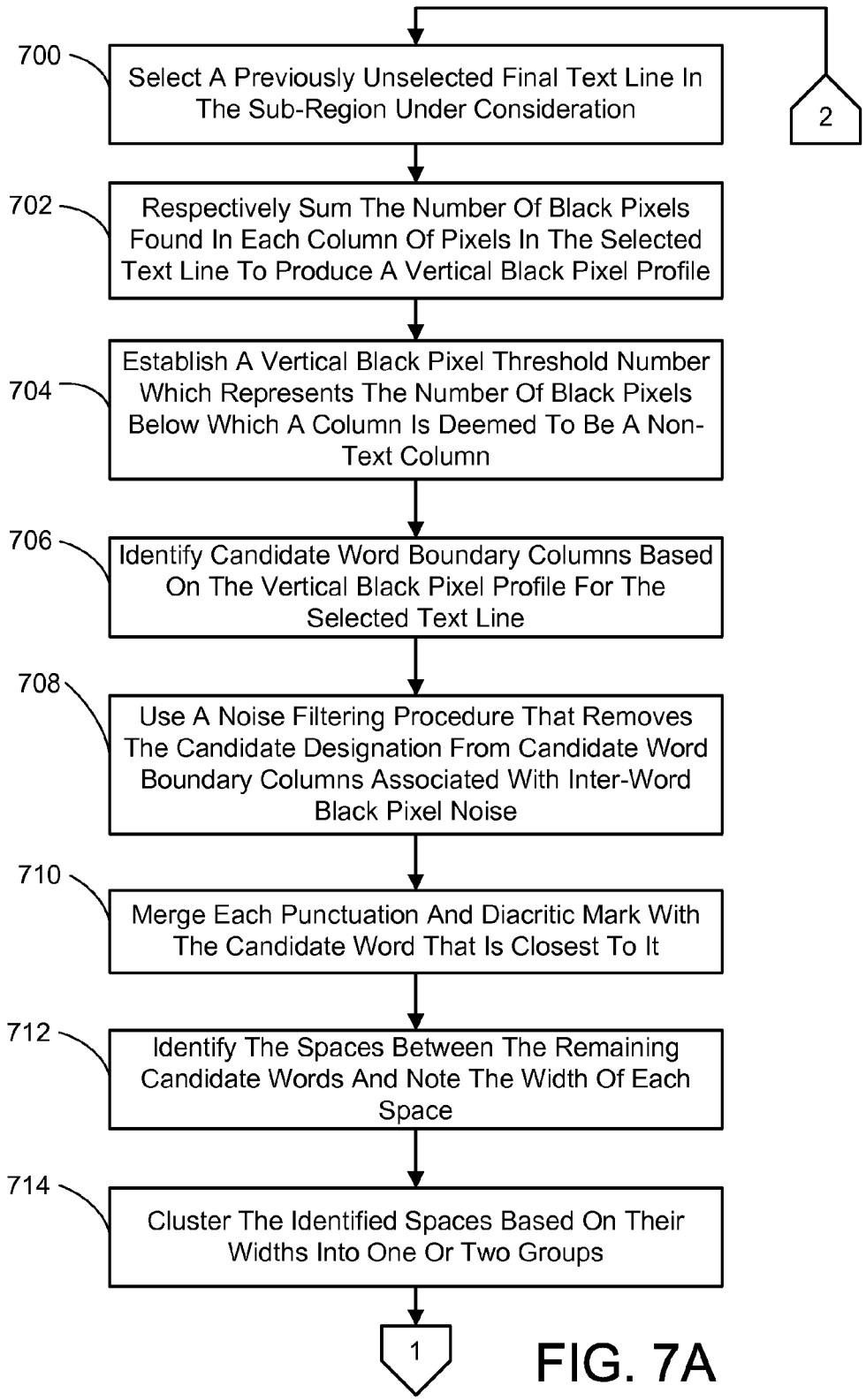
FIGS. 7A-B are a continuing flow diagram generally outlining one embodiment of a process for text word segmentation.
Figure 7B:
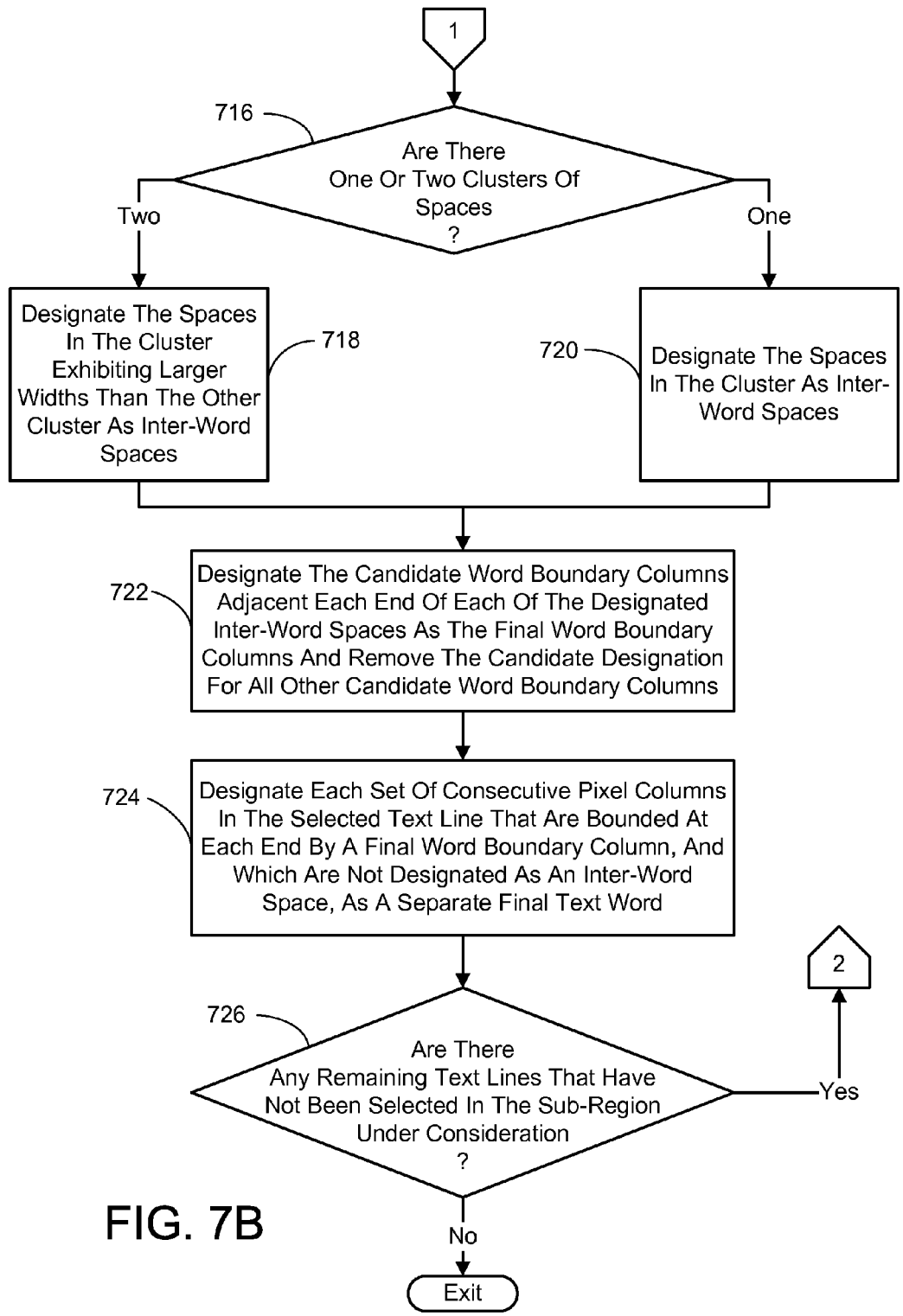

In view of the foregoing, in one embodiment exemplified in FIGS. 7A-B, the word segmentation task is accomplished as follows for each text line in a text region under consideration. First, a previously unselected final text line is selected (700). The number of black pixels found in each column of pixels in the selected text line is respectively summed to produce a vertical black pixel profile (702). Next, candidate word boundary columns are identified based on the vertical black pixel profile for the selected text line (704). In general, a candidate word boundary column is a pixel column that is possibly either the first column or the last column in a set of consecutive columns that make up a word in the selected text line.

Figure 8:
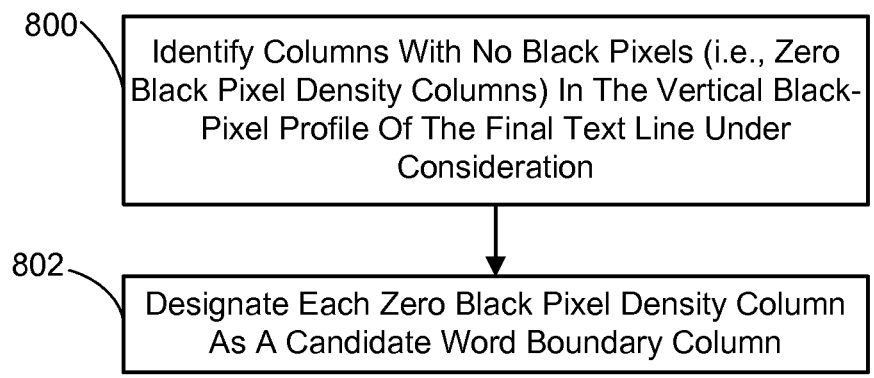
FIG. 8 is a flow diagram generally outlining an implementation of the part of the process of FIGS. 7A-B involving the identification of candidate word boundary columns.

In one exemplary implementation shown in FIG. 8, identifying candidate word boundary columns is accomplished by first identifying columns with no black pixels (i.e., zero black pixel density columns) in the vertical black-pixel profile of the final text line under consideration (800) and then designating each zero black pixel density column as a candidate word boundary column (802). When each candidate word boundary column is designated, it is also noted whether it is at the right end or left end of the potential word it bounds. This not only identified the potential words as the columns between these left and right candidate word boundary column, but also identifies the spaces between these potential words (i.e., the columns between the identified potential words). It is noted that a zero black pixel threshold can be used to identify candidate word boundary columns, but not for inter-line boundary rows, because reflow techniques are generally more tolerant to inter-word noise than inter-line noise.

It is further noted that the noise between words (which appears as extraneous black pixels in the white space between words) can rise to a level that a set of pixel columns that are supposed to be white space separating words, are instead identified as a separate word. Referring again to FIGS. 7A-B, this noise issue can generally be handled using a noise filtering procedure that removes the candidate designation from candidate word boundary columns associated with inter-word black pixel noise (708). This in effect removes the candidate status from any mis-identified candidate text words that were actually black pixel noise rather than text.

Figure 10:
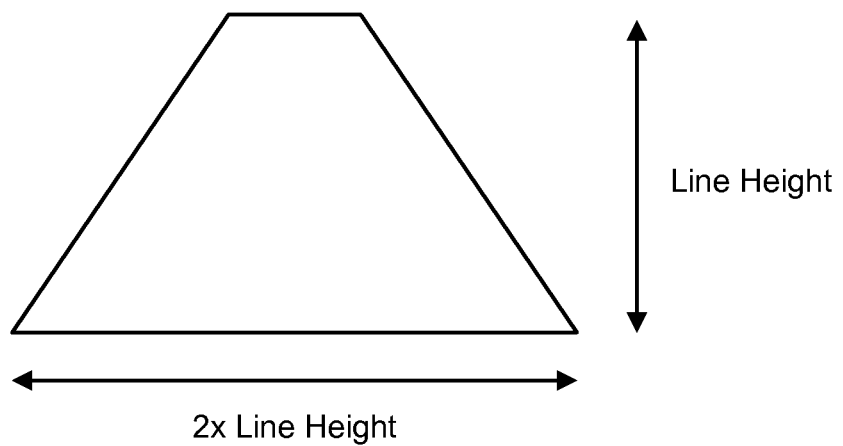
FIG. 10 is a flow diagram generally outlining an implementation of the part of the process of FIGS. 7A-B involving the identification of candidate words.
Figure 9:
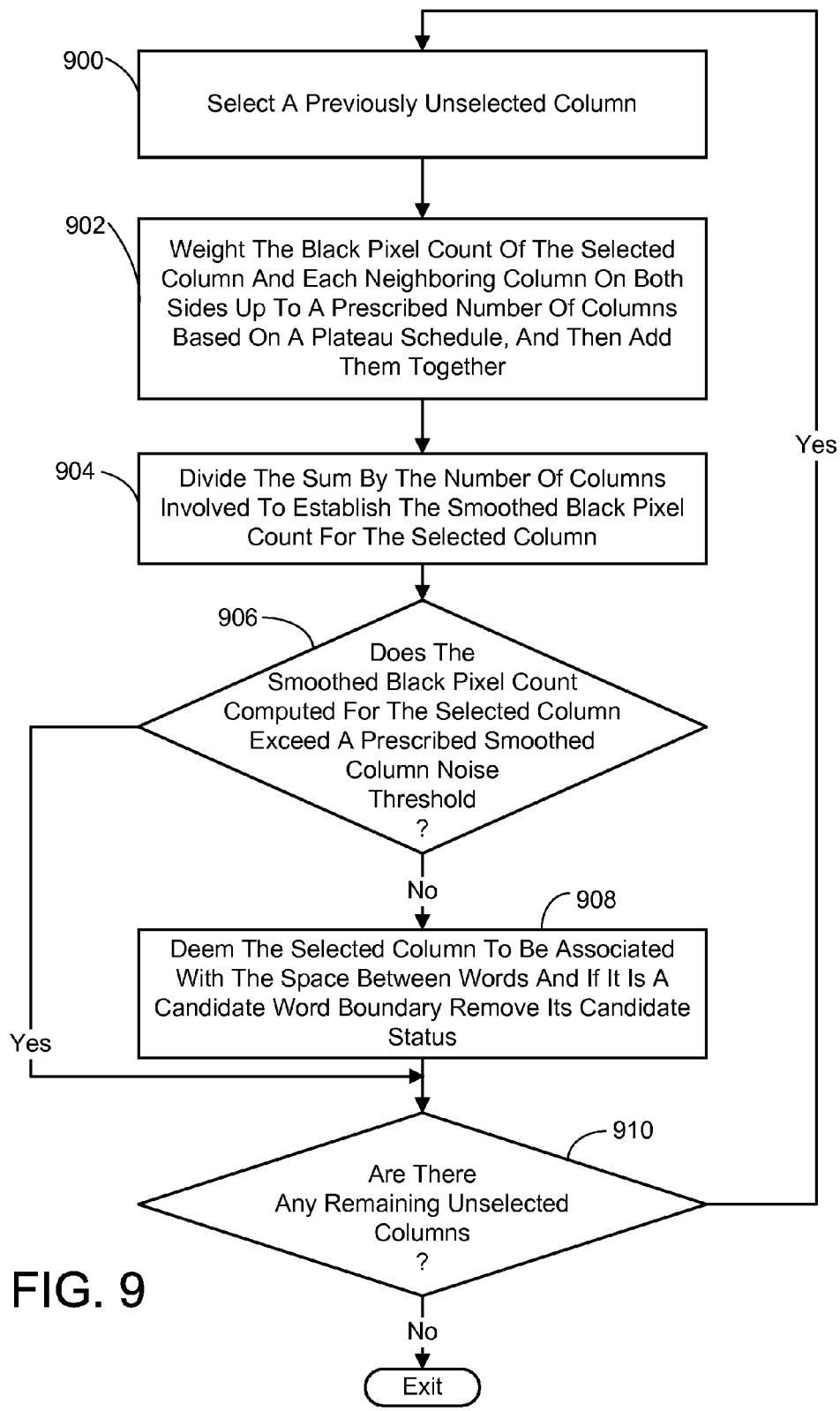
FIG. 9 is a flow diagram generally outlining an implementation of the part of the process of FIGS. 7A-B involving the removal of candidate word boundary columns associated with inter-word noise.

However, as described previously, care is taken in removing candidate word boundary columns thought to be associated with inter-word black pixel noise so that candidate word boundary columns associated with punctuation or diacritic marks are not mistaken for noise and eliminated. It is recognized that a candidate word boundary column associated with a punctuation or diacritic mark will have neighboring columns on one side or the other that have significant black pixel counts since they will be associated with the aforementioned marks and adjacent words. On the other hand, the neighboring columns on either side of a candidate word boundary column associated with inter-word black pixel noise will typically have low black pixel densities. This observation can be exploited to identify and "de-designate" candidate word boundary columns associated with inter-word black pixel noise. More particularly, in one exemplary implementation shown in FIG. 9, the foregoing task of removing candidate word boundary columns associated with inter-word noise is accomplished as follows. First, a previously unselected column in the text line under consideration is selected (900). A smoothed black pixel count is then computed for the selected column. More particularly, a plateau-type weighted filtering scheme is employed as follows. The black pixel count of the selected column and each neighboring column on both sides up to a prescribed number of columns (or the edge of the selected line in the case where the beginning or end of the line is encountered at a distance less than the prescribed number of columns) is weighted based on a plateau schedule, and then added together (902). This sum is then divided by the number of columns involved to establish the aforementioned smoothed black pixel count for the selected column (904). It is noted that in one exemplary implementation of the plateau-type weighted filtering scheme shown in FIG. 10, the prescribed number of columns equaled the number of rows making up the height of the selected text line. Thus, columns up to a distance equal to the height of the selected line are considered in each direction from the selected column (i.e., a 2× height plateau filter). In addition, the weight applied to the selected column and a prescribed number of columns on either side is set to 1.0, with the weights applied to succeeding columns on both side of the selected column linearly decreasing to zero the further away the column is from the selected column. Thus, the value of the weighting factor applied to each column is dependent on how far it is from the selected word boundary column. It is noted that in one implementation, the weight function remains equal to 1.0 for $3/14$ of all columns on either side. For the remaining $4/14$ of the columns on either side, the weight function decays linearly. Thus, the fraction of columns on top of the plateau is $3/14+3/14=3/7$. Referring again to FIG. 9, it is next determined if the smoothed black pixel count computed for the selected column exceeds a prescribed smoothed column noise threshold (906). In one exemplary implementation, the smoothed column noise threshold was set to the window-width/40. If it does not, then the selected column is deemed to be associated with the spaces between the currently identified potential text words, and if the selected column is a candidate word boundary column its candidate status is removed (908). If it does exceed the threshold, no action is taken. In either case, it is next determined if there are any remaining unselected columns (910). If so, actions 900 through 910 are repeated, until all the columns in the text line under consideration have been processed.

As indicated previously, some scripts have inter-word punctuation and diacritics marks that appear within a line of text (as opposed to above or below). A set of pixel columns depicting these marks could then have been identified as a separate word in the foregoing procedure. This could result in a punctuation mark ending up at the beginning of a line of words after a reflow procedure. Referring once again to FIGS. 7A-B, this punctuation and diacritics mark issue can generally be handled by merging the mark with the candidate word that is closest to it (710).

Figure 11:
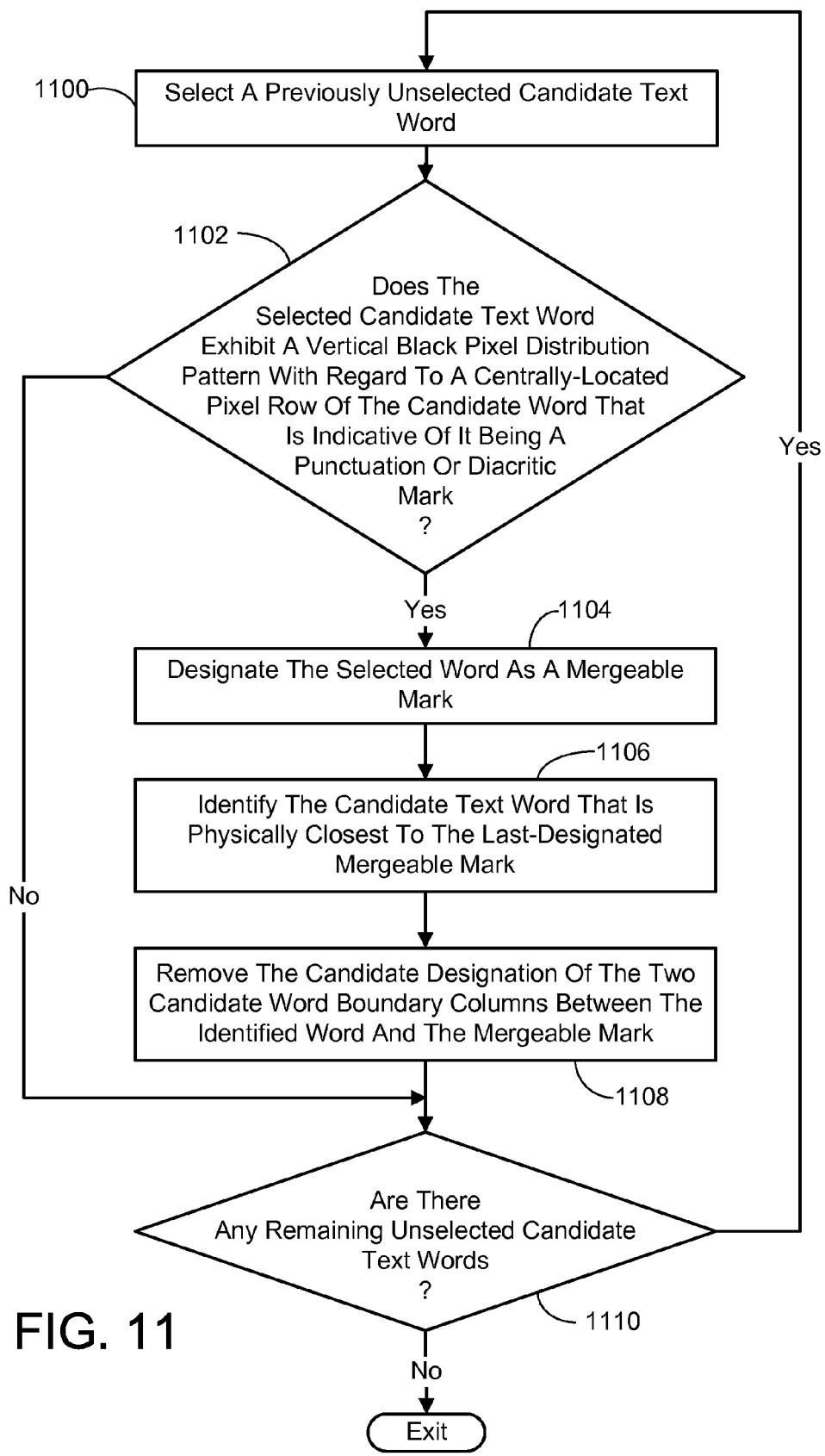
FIG. 11 is a flow diagram generally outlining an implementation of the part of the process of FIGS. 7A-B involving the identification and merging of inter-word punctuation and diacritic marks.

It is noted that many punctuation and diacritic marks appear almost entirely above or below the central row of a line of text, regardless of the script. Other punctuation and diacritic marks can be as tall as the rest of the characters in a line of text, but will have black pixel distribution pattern with regard to the central row of the line that makes them recognizable. These patterns can be exploited to identify a punctuation or diacritic mark in a line of text so that it can be merged with the nearest neighboring character. More particularly, in one exemplary implementation shown in FIG. 11, the foregoing task of identifying and merging inter-word punctuation and diacritic marks is accomplished as follows. First, a previously unselected candidate text word is selected (1100). It is then determined if the selected candidate text word exhibits a vertical black pixel distribution pattern with regard to a centrally-located pixel row of the candidate word that is indicative of it being a punctuation or diacritic mark (1102). If so, the selected word is designated as a mergeable mark (1104). Otherwise, no action is taken and the procedure skips to action 1110. The candidate text word that is physically closest to the last-designated mergeable mark is then identified (1106), and the candidate designation of the two candidate word boundary columns between the identified word and the mergeable mark (i.e. the candidate word boundary column at the end of the identified word closest the mergeable mark and the candidate word boundary column at the end of the mergeable mark closest to the identified word) is removed (1108). This has the effect of merging the identified word and the mergeable mark into a single candidate text word as now the text of the word and the mergeable mark are both contained within the remaining candidate word boundary columns associated therewith. It is next determined if there are any remaining previously unselected candidate text words (1110). If so, actions 1100 through 1110 are repeated, until all the candidate text words have been processed.

Referring yet again to FIGS. 7A-B, once the punctuation and diacritics marks have been merged with the closest candidate word, the spaces between the remaining candidate words are identified and the width of each space is noted (712). The identified spaces are then clustered based on their widths into one or two groups (714). It is also noted that all the spaces between the candidate words are either inter-word spaces or spaces existing in a word itself (i.e., intra-word spaces) such as are found between letters and characters in Latin script. Since the task at hand is to segment the words in a text line, these two possibilities need to be differentiated so that the intra-word spaces can be eliminated from consideration thereby ensuring that complete words are identified in the segmentation procedure. It is further noted that some scripts do not employ intra-word spaces (e.g., scripts like Devnagari). As such, the foregoing clustering will result in a single group, rather than two groups as is the case when the script has intra-word spaces. In view of the foregoing, it is next determined if there are one or two clusters of spaces (716). If there are two clusters, the spaces in the cluster exhibiting larger widths than the other cluster are designated as inter-word spaces (718). If there is just one cluster, then the spaces in that cluster are designated as inter-word spaces (720). The candidate word boundary columns adjacent each end of each of the designated inter-word spaces are designated as the final word boundary columns and the candidate designation for all other candidate word boundary columns (e.g., those adjacent the intra-word spaces) is removed (722). Next, each set of consecutive pixel columns in the selected text line that are bounded at each end by a final word boundary column, and which are not designated as an inter-word space, is designated as a separate final text word (724). It is then determined if there are any remaining text lines that have not been selected (726). If there are remaining text lines, then actions 700 through 726 are repeated. Otherwise, the word segmentation process ends.

Figure 12:
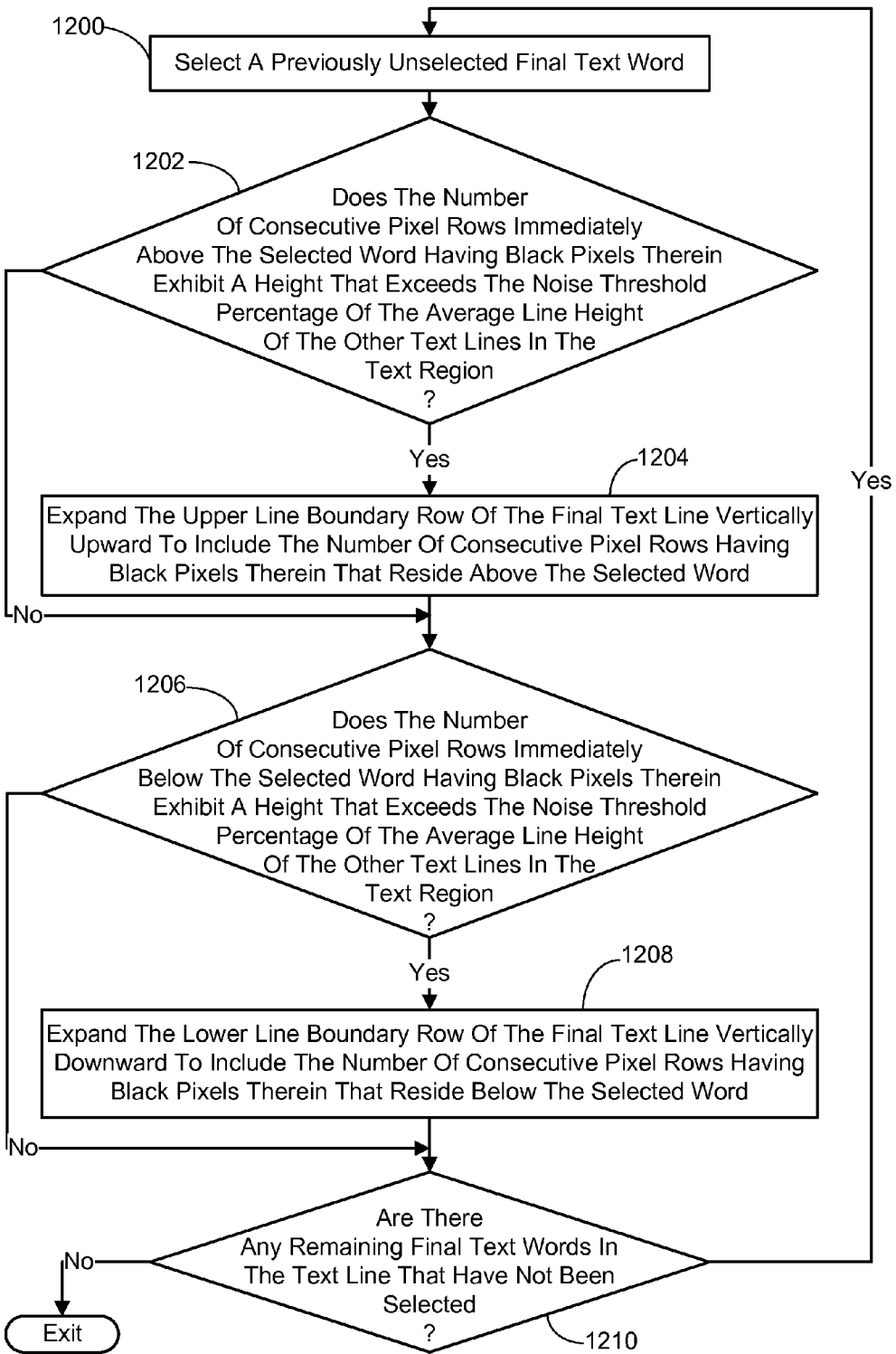
FIG. 12 is a flow diagram generally outlining an implementation of the process for performing an additional upper and lower word boundary check.

It is noted that in some cases, despite the merging of diacritic and accent lines into the closest adjacent text line as described previously, the upper and/or lower boundaries associated with a final text word could be such that they cut through the word. This has been observed to happen in diacritic heavy scripts like Kannada and other south Indian languages. In order to improve accuracy of the segmentation in such cases, in one implementation the following additional boundary check is performed. Referring to FIG. 12, for each final text line in the text region under consideration, a previously unselected final text word is selected (1200). It is then determined if the number of consecutive pixel rows residing immediately above the selected word which have black pixels therein exhibit a height that exceeds the previously described noise threshold percentage of the average line height of the other text lines in the text region under consideration (1202). If so, then the upper line boundary row of the final text line under consideration is expanded vertically upward to include the aforementioned number of consecutive pixel rows residing above the selected word (1204). This can be accomplished in one implementation by removing the line boundary row designation from the current upper boundary of the line under consideration and instead designating the last pixel row found to include black pixels in the number of consecutive pixel rows residing above the selected word having black pixels therein, as the line boundary row. If, however, it is determined the noise threshold percentage is not exceeded, then no action is taken, but in either case, it is next determined if the number of consecutive pixel rows residing immediately below the selected word that have black pixels therein exhibit a height that exceeds the previously described noise threshold percentage of the average line height of the other text lines in the text region under consideration (1206). If so, then the lower line boundary row of the final text line under consideration is expanded vertically downward to include the aforementioned number of consecutive pixel rows residing below the selected word (1208). This can be accomplished in one implementation by removing the line boundary row designation from the current lower boundary of the line under consideration and instead designating the last pixel row found to include black pixels in the number of consecutive pixel rows residing below the selected word having black pixels therein, as the line boundary row. If, however, it is determined the noise threshold percentage is not exceeded, then no action is taken, but in either case, it is next determined if there are any remaining final text words in the text line under consideration that have not been selected and processed (1210). If so, process actions 1200 through 1210 are repeated until all the final text words have been processed. It is noted that the foregoing additional boundary check is performed only in those implementations where the aforementioned procedure of expanding the pixel rows above and below a line during text line segmentation does not include making them white pixels only rows. It is further noted that in an alternate implementation the pixel rows below the selected word can be address first before those above the word.

1.2.3 Paragraph Segmentation and Noting Flow Direction

Reflow techniques reflow the words in each paragraph separately. Thus, the text being reflowed is also segmented into paragraphs. First, it is noted that each of the text regions described above is considered to be at least one separate paragraph. However, it is possible that there is more than one paragraph in a region. In one embodiment of the script-agnostic text reflow technique, it is required that each paragraph of text in a segmentable document image be indented by at least a prescribed distance, and that each paragraph be at least two text lines long. Thus, if one or more indented text lines are found, a new paragraph is deemed to start at each indentation. If there are no indentations found, then it is deemed that the text region under consideration is a single paragraph in the document image. If an indentation space is found, but it is not in the first line of the text region, then the text preceding and after the indentation are deemed to be separate paragraphs. Further, text can be read, and so flow in a reflow procedure, from left-to-right or from right-to-left, depending on the script. In script that flows from left-to-right, the indentation space is placed at the beginning of the left side of a text line representing a new paragraph. Conversely, in script that flows from right-to-left, the indentation space is placed at the end of the right side of a text line representing a new paragraph. Accordingly, it is possible to discern in a script-agnostic way whether the text in a paragraph of a document image flows left-to-right, or right-to-left.

Figure 13:
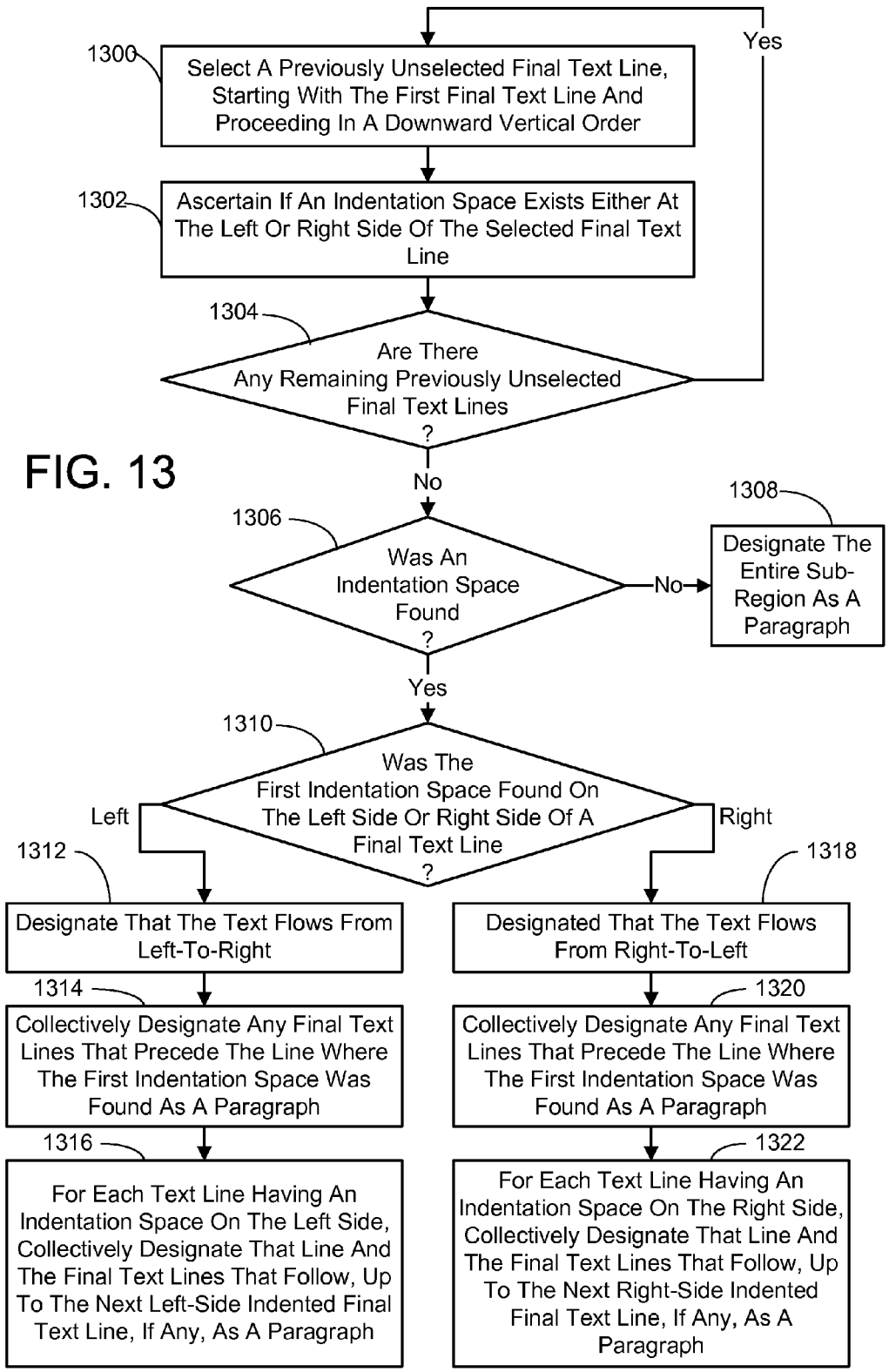
FIG. 13 is a flow diagram generally outlining one embodiment of a process for segmenting the text in a document image into paragraphs.

More particularly, in one exemplary embodiment shown in FIG. 13, the foregoing task of segmenting the text in a document image into paragraphs is accomplished as follows for each of the aforementioned regions of text from the document image. A previously unselected final text line is selected, starting with the first final text line and proceeding in a downward vertical order from there (1300). It is then ascertained if an indentation space exists either at the left or right side of the selected final text line (1302). An indentation space is a set of consecutive columns preceding the leftmost final text word in the selected final text line if at the left side of that line, or a set of consecutive columns following the rightmost final text word in the selected final text line if at the right side of that line. It also has a width exceeding a prescribed indentation threshold. In one implementation, the indentation threshold was set to equal the width of longest word that occurs first on any line. It is next determined if there are any remaining previously unselected final text lines (1304). If there are remaining unselected final text lines, then the next line in order is selected by repeating actions 1300 through 1304. If no unselected lines remain, then it is determined if an indentation space was found (1306). If not, then the entire text region is designated as a paragraph (1308). However, if one or more indentation spaces were found, it is determined if the first indentation space discovered was found on the left side or right side of the final text line involved (1310). If it was found on the left side, then it is designated that the text flows from left-to-right (1312). In addition, any final text lines that precede the line where the first indentation space was found are collectively designated as a paragraph (1314). Still further, for each text line where an indentation space was found on the left side of a final text line, that line and the final text lines following that line, up to the next final text line, if any, where an indentation space was found on the left side, are collectively designated as a paragraph (1316). Thus, this last action results in each group of final text lines with an indentation space at the left side of the first line thereof, being designated as separate paragraphs. If however one or more indentation spaces were found, but on the right side, then it is designated that the text flows from right-to-left (1318). In addition, any final text lines that precede the line where the first indentation space was found are collectively designated as a paragraph (1320). Still further, for each text line where an indentation space was found on the right side of a final text line, that line and the final text lines following that line, up to the next final text line, if any, where an indentation space was found on the right side, are collectively designated as a paragraph (1322). Thus, this last action results in each group of final text lines with an indentation space at the right side of the first line thereof, being designated as separate paragraphs.

1.3 Reflow and Word Alignment

After segmenting the text into lines, words and paragraphs, standard reflow methods are employed to reflow the text. For example, two appropriate choices for reflowing text within a specified width on a display are the greedy approach and the dynamic programming based approach. The choice of the reflow method is left up to the user.

However, since it is document images that are being reflowed (and not text directly), it is possible that words taken from a text line and placed in a succeeding line will not match up vertically. Thus, in one embodiment, the trailing word or words taken from one line and placed in the next line are aligned with the words in that succeeding line. This alignment is achieved by considering again the horizontal black pixel profile of all lines and identifying peaks in these profiles. In general, words from different lines are aligned by vertically matching the pixel row in the word or words being moved that corresponds to the maximum black pixel density in horizontal black pixel profile of the text line they are coming from, to the pixel row in the text line receiving the word or words that corresponds to the maximum black pixel density in horizontal black pixel profile of that line.

Figure 14:
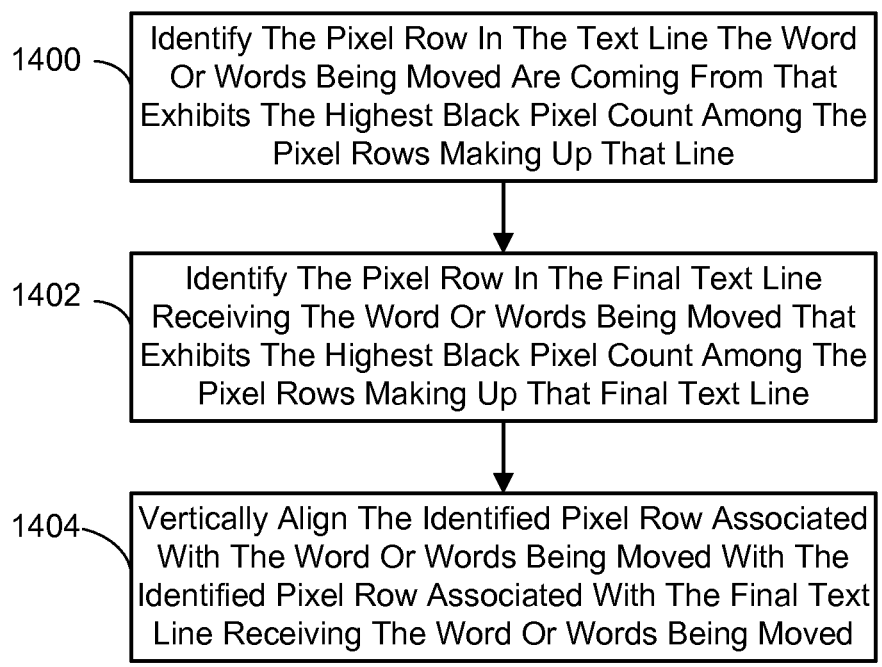
FIG. 14 is a flow diagram generally outlining one embodiment of a process for vertically aligning the final text word or words moved from one text line, with the next text line they are being moved into.

In view of the foregoing, in one exemplary implementation shown in FIG. 14, the task of vertically aligning the final text word or words moved from one text line, with the next text line they are being moved into, is accomplished as follows. First, the pixel row in the text line the word or words being moved are coming from that exhibits the highest black pixel count among the pixel rows making up that line are identified (1400). The pixel row in the final text line receiving the word or words being moved that exhibits the highest black pixel count among the pixel rows making up that final text line is then identified (1402). Next, the identified pixel row associated with the word or words being moved is vertically aligned with the identified pixel row associated with the final text line receiving the word or words being moved (1404).

2.0 The Computing Environment

A brief, general description of a suitable computing environment in which portions of the script-agnostic text reflow technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 15:
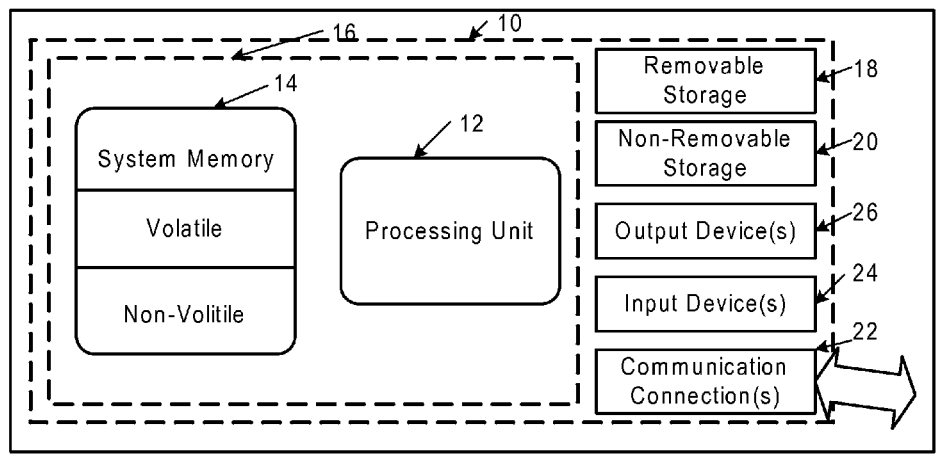
FIG. 15 is a diagram depicting a general purpose computing device constituting an exemplary system for implementing script-agnostic text reflow technique embodiments described herein.

FIG. 15 illustrates an example of a suitable computing system environment. The computing system environment is only one example of a suitable computing environment and is not intended to suggest any limitation as to the scope of use or functionality of technique embodiments described herein. Neither should the computing environment be interpreted as having any dependency or requirement relating to any one or combination of components illustrated in the exemplary operating environment. With reference to FIG. 15, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 15 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 15 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well known in the art and need not be discussed at length here.

The script-agnostic text reflow technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices. Still further, the aforementioned instructions could be implemented, in part or in whole, as hardware logic circuits, which may or may not include a processor.

3.0 Other Embodiments

In the foregoing description of embodiments for script-agnostic text reflow, the focus was on text written in straight horizontal lines that is read from top to bottom. However, the same procedures could be applied to vertically-oriented scripts—especially ones that exhibit the characteristics described previously (albeit rotated in orientation by 90 degrees).

Figure 16:
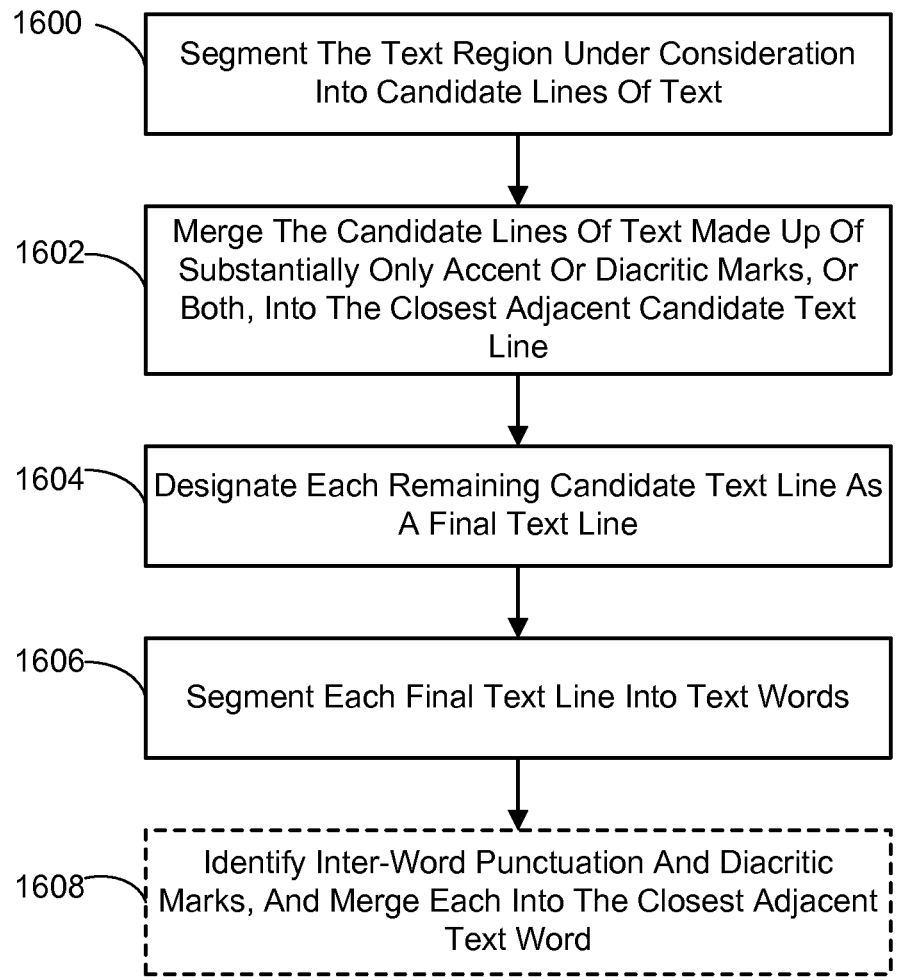
FIG. 16 is a flow diagram generally outlining one embodiment of a process for segmenting a binarized region of text from a document image in a script-agnostic manner.

In addition, it is noted that the foregoing procedure for segmenting document image text in to lines and words could be applied to applications other than reflowing. In one general implementation of such a simplified embodiment, as shown in FIG. 16, a binarized region of text from a document image is segmented in a script-agnostic manner by first segmenting the text region into candidate lines of text (1600). The candidate lines of text made up of substantially only accent or diacritic marks, or both, are then merged into the closest adjacent candidate text line (1602), and each remaining candidate text lines is designated as a final text line (1604). Each final text line is then segmented into text words (1606). The process could end at this point. However, if it is not desired that inter-word punctuation and diacritic marks be in some cases identified as separate words, then the procedure can be expanded, as shown in the dashed lined boxes in FIG. 16, by identifying inter-word punctuation and diacritic marks, if any, and merging each identified mark into the closest adjacent text word (1608).

Still further, while the foregoing description of the clustering the inter-word space widths in FIG. 7 involved clustering each line of text separately, this need not be the case. In an alternate implementation, process actions 700 through 714 of FIG. 7 are repeated for each of the text lines in the text region. Then, the clustering is performed across all the text lines of the text region. This can produce a more accurate clustering than if the inter-word and intra-word spaces are considered within a single line. In this alternate implementation, process actions 716 through 726 would be performed on all the text lines in parallel rather on a line by line basis.

Figure 17A:
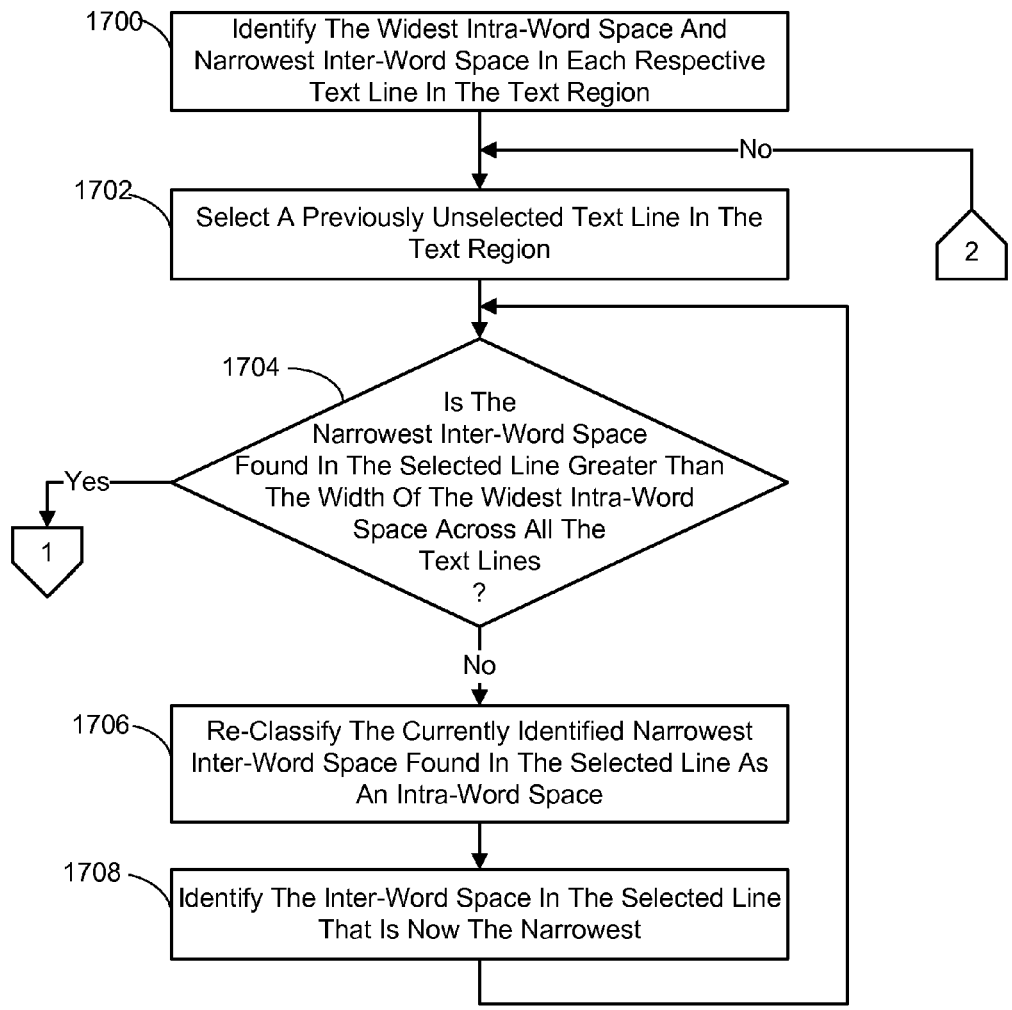
FIGS. 17A-B are a continuing flow diagram generally outlining one embodiment of a process for ensuring that the inter-word space widths are consistent across text lines.
Figure 17B:
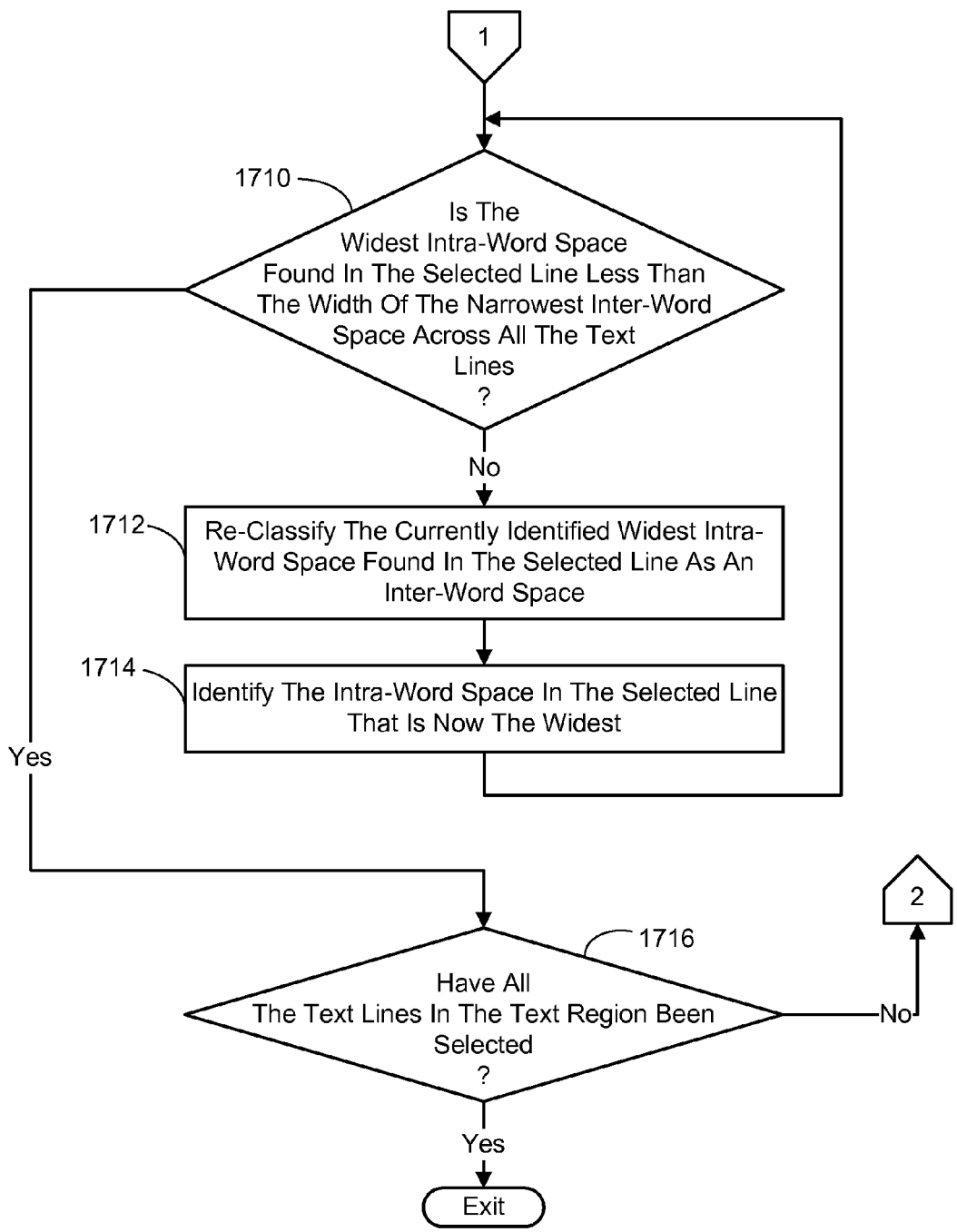

In addition, in one implementation an additional check is performed to ensure that the inter-word space widths are consistent across text lines in the text region under consideration after the inter-word and intra-word spacings have been computed for all the text lines in the text region. More particularly, referring to FIGS. 17A-B, the widest intra-word space and narrowest inter-word space are identified in each respective text line in the text region under consideration (1700). Next, a previously unselected text line in the text region under consideration is selected (1702). It is then determined if the narrowest inter-word space found in the selected line is greater than the width of the widest intra-word space across all the text lines (1704). If this is not the case, then the currently identified narrowest inter-word space found in the selected line is re-classified as an intra-word space (1706), and the inter-word space in the selected line that is now the narrowest is identified (1708). Process actions 1704 and 1708 are then repeated as appropriate, as shown in FIGS. 17A-B. Whenever the currently identified narrowest inter-word space found in the selected line is determined to be greater than the width of the widest intra-word space across all the text lines in process action 1704, it is next determined if the widest intra-word space found in the selected line is less than the width of the narrowest inter-word space across all the text lines (1710). If this is not the case then the currently identified widest intra-word space found in the selected line is re-classified as an inter-word space (1712), and the intra-word space in the selected line that is now the widest is identified (1714). Process actions 1710 and 1714 are then repeated as appropriate, as shown in FIGS. 17A-B. Whenever the currently identified widest intra-word space found in the selected line is determined to be less than the width of the narrowest inter-word space across all the text lines in process action 1710, it is next determined if all the text lines in the text region under consideration have been selected and processed (1716). If not, then process actions 1702 through 1716 are repeated as appropriate. When all the text lines in the text region under consideration have been selected and process, the additional check is complete for that text region. It is noted that this type of check is particularly good when dealing with one-word lines and lines with high variability in inter-word space widths. It is further noted that in an alternate implementation of the foregoing inter-space and intra-space check, the order in which the spaces are checked can be reversed. In other words, the widest intra-word spaces in a text line could be processed before the narrowest inter-word spaces in the line.

It is further noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for reflowing a binarized region of text from a document image into a specified-width display area on an electronic display in a script-agnostic manner, comprising:
using a computer to perform the following process actions:
segmenting the text region into candidate lines of text, said candidate lines of text comprising at least one line of text comprising substantially only accent or diacritic marks, or both;
merging candidate lines of text comprising substantially only accent or diacritic marks, or both, into the closest adjacent candidate text line;
designating each remaining candidate text line as a final text line;
segmenting each final text line into candidate text words;
identifying inter-word punctuation and diacritic marks, if any, and merging each identified mark into the closest adjacent candidate text word;
designating final text words based on the remaining candidate text words;
segmenting the final text lines into paragraphs; and
for each paragraph, reflowing the final text words found therein so as to fit into said specified-width display area while maintaining the original sequential order.

2. The process of claim 1, wherein the text region comprises rows of pixels each pixel of which is either a black pixel or a white pixel, and wherein the process action of segmenting the text region into candidate text lines, comprises the actions of:
for each respective row of pixels in the text region, summing the number of black pixels to produce a horizontal black pixel profile for the text region;
establishing a horizontal black pixel threshold number based on the horizontal black pixel profile, said horizontal black pixel threshold number representing the number of black pixels below which a row of pixels is deemed to be a non-text row;
identifying candidate line boundary rows based on the horizontal black pixel profile, wherein a candidate line boundary row is a pixel row that may be the first row of pixels or may be the last row of pixels in a set of consecutive pixel rows comprising a line of text; and
identifying candidate text lines, wherein a candidate text line comprises a set of consecutive pixel rows bounded on the top and bottom respectively by one of the identified candidate line boundary rows and whose rows collectively exhibit a height and black pixel density indicative of text.

3. The process of claim 2, wherein the process action of identifying candidate line boundary rows, comprises the actions of:
finding local minima rows in the horizontal black-pixel profile of the text region; and
for each of the minima rows discovered,
determining if the number of black pixels in the minima row falls below the horizontal black pixel threshold number, and
whenever the number of black pixels in the minima row falls below the horizontal black pixel threshold number, designating the minima row as a boundary row.

4. The process of claim 2, wherein the process action of identifying candidate text lines, comprises the actions of:
for each pair of consecutive candidate line boundary rows, determining if a set of consecutive rows between and including the pair of consecutive candidate line boundary rows has an average black pixel count that exceeds the horizontal black pixel threshold number, and
whenever the set of consecutive rows between and including the pair of consecutive candidate line boundary rows has an average black pixel count that exceeds the horizontal black pixel threshold number, designating the set of consecutive rows as a candidate line of text.

5. The process of claim 2, wherein the process action of merging candidate lines of text comprising substantially only accent or diacritic marks, or both, into the closest adjacent candidate text line, comprises the action of:
for each candidate text line,
determining if the text line has a height that is no more than a prescribed accent and diacritic threshold percentage of the height of the other text lines in the text region, and
whenever the candidate text line has a height that is no more than the prescribed accent and diacritic threshold percentage of the height of the other text line of the pair,
merging the candidate text line with the closest adjacent candidate text line by removing the candidate status of the candidate line boundary rows lying between them, and
re-designating the merged candidate text lines as a single candidate text line.

6. The process of claim 2, further comprising performing prior to performing the process action of merging candidate lines of text comprising substantially only accent or diacritic marks, or both, into the closest adjacent candidate text line, a process action of removing the candidate status from each candidate text line that is attributable to inter-line black pixel noise rather than to text.

7. The process of claim 6, wherein the process action of removing the candidate status from each candidate text line that is attributable to inter-line black pixel noise rather than to text, comprises the actions of:
for each of the candidate text lines;
determining if the candidate text line has a height that is no more than a prescribed noise threshold percentage of the average line height of the other text lines in the text region that the candidate text line belongs to, and
whenever it is found that the candidate text line has a height that is no more than a prescribed noise threshold percentage of the average line height of the other text lines in the text region that the candidate text line belongs to, designating the candidate text line to be a noise line, and removing the candidate status from the candidate text line boundary rows flanking the candidate text line and the candidate status from the candidate text line.

8. The process of claim 2, further comprising, prior to performing the process action of designating each remaining candidate text lines as a final text line, performing the process actions of:

ascertaining the height of the tallest final text line in the text region, and expanding the height of each of the final lines in the text region that are shorter than the tallest final text line equally in both directions until their height equals the tallest final text line.

9. The process of claim 1, wherein the text region comprises columns of pixels each pixel of which is either a black pixel or a white pixel, and wherein the process action of segmenting each final text line into candidate text words, comprises the actions of:

for each final text line in the text region, respectively summing the number of black pixels in each column of pixels in the final text line to produce a vertical black pixel profile for the final text line, identifying candidate word boundary columns based on the vertical black pixel profile for the text line, wherein a candidate word boundary column is a pixel column that can be the first column or can be the last column in a set of consecutive pixel columns comprising a text word and which exhibits a zero black pixel density, and removing the candidate designation from each candidate word boundary column that is attributable to inter-word black pixel noise rather than text.

10. The process of claim 9, further comprising, after performing the process action of designating final text words based on the remaining candidate text words, performing the actions of:

for each final text word in each final text line, determining if a number of consecutive pixel rows residing immediately above the word under consideration that have black pixels therein exhibit a height that exceeds a prescribed noise threshold percentage of the average line height of the other text lines in the text region under consideration, whenever it is determined the prescribed noise threshold percentage is exceeded above the word, expanding an upper line boundary row of the final text line under consideration vertically upward to include said number of consecutive pixel rows residing above the selected word, determining if a number of consecutive pixel rows residing immediately below the word under consideration that have black pixels therein exhibit a height that exceeds the prescribed noise threshold percentage of the average line height of the other text lines in the text region under consideration, and whenever it is determined the prescribed noise threshold percentage is exceeded below the word, expanding a lower line boundary row of the final text line under consideration vertically downward to include said number of consecutive pixel rows residing below the selected word.

11. The process of claim 9, wherein the process action of removing the candidate designation from each candidate word boundary column that is attributable to inter-word black pixel noise rather than text, comprises the actions of:

for each column, applying a weighting factor to the black pixel count of the column under consideration and that of each neighboring column on both sides up to a prescribed number of columns, wherein the value of the weighting factor is dependent on how far the column is from the column under consideration, summing the weighted black pixel counts of the column under consideration and each neighboring column on both sides up to the prescribed number of columns, dividing the summed weighted black pixel counts by the number of columns involved in the summing action to establish a smoothed black pixel count for the column under consideration, ascertaining if the smoothed black pixel count computed for the column under consideration exceeds a prescribed smoothed column noise threshold, and whenever the smoothed black pixel count computed for the column under consideration does not exceed the prescribed smoothed column noise threshold, deeming that column to be part of a space between words and whenever that column is a candidate word boundary column, removing the candidate designation from the column.

12. The process of claim 11, wherein the process action of applying a weighting factor to the black pixel count of the column under consideration and that of each neighboring column on both sides up to a prescribed number of columns, comprises the actions of:

applying a weighting factor of 1.0 to the column under consideration and that of a first prescribed number of neighboring columns on both sides of the column under consideration;

for a second prescribed number of neighboring columns lying outside the first prescribed number of neighboring columns on a first side of the column under consideration, applying a weighting factor to each of the second prescribed number of neighboring columns which decays linearly the further away the neighboring column is from the column under consideration; and for the second prescribed number of neighboring columns lying outside the first prescribed number of neighboring columns on a second side of the column under consideration, applying a weighting factor to each of the second prescribed number of neighboring columns which decays linearly the further away the neighboring column is from the column under consideration.

13. The process of claim 9, wherein the process action of identifying inter-word punctuation and diacritic marks, if any, and merging each identified mark into the closest adjacent candidate text word, comprises the action of:

for each candidate text word, ascertaining if the candidate text word exhibits a vertical black pixel distribution pattern with respect to a centrally-located pixel row of the candidate text word that is indicative of it being a punctuation or diacritic mark, whenever the candidate text word is found to exhibit a vertical black pixel distribution pattern with respect to the centrally-located pixel row of the candidate text word that is indicative of it being a punctuation or diacritic mark, designating the candidate text word to be a mergeable mark,
identifying the candidate text word that is physically closest to the mergeable mark, and
removing the candidate designation from each of the candidate word boundary columns located between the identified candidate text word, which is physically closest to the mergeable mark, and the mergeable mark, to create a single candidate text word comprising the identified candidate text word and the mergeable mark.

14. The process of claim 9, wherein the process action of designating final text words based on the remaining candidate text words, comprises the actions of:
identifying the spaces between the remaining candidate text words;
clustering the identified spaces by width into one or two groups;
whenever the identified spaces are clustered into two groups, designating the spaces in the cluster of spaces exhibiting larger widths than the spaces in the other cluster to be inter-word spaces and the spaces in the cluster of spaces exhibiting smaller widths than the spaces in the other cluster to be intra-word spaces;
whenever the identified spaces are clustered into one group, designating the spaces in the cluster to be inter-word spaces;
designating the candidate word boundary columns adjacent each end of each of the designated inter-word spaces as final word boundary columns and remove the candidate designation from all other candidate word boundary columns; and
designating each set of consecutive pixel columns that are bounded at each end by a final word boundary column, and which are not designated as an inter-word space, as a final text word.

15. The process of claim 14, further comprising the process actions of:
(a) identifying the widest intra-word space and narrowest inter-word space in each respective text line in the text region under consideration;
(b) for each final text line,
(i) determining if the narrowest inter-word space found in the final text line is greater than the width of the widest intra-word space across all the final text lines,
(ii) whenever it is determined that the narrowest inter-word space found in the final text line is not greater than the width of the widest intra-word space across all the final text lines,
(iii) re-classifying the currently identified narrowest inter-word space found in the final text line under consideration as an intra-word space, and
(iv) identifying the inter-word space in the final text line under consideration that is currently the narrowest, and
(v) repeating actions b(i) through b(iv) until it is determined the currently identified narrowest inter-word space found in the final text line is greater than the width of the widest intra-word space across all the final text lines,
(vi) determining if the widest intra-word space found in the final text line is less than the width of the narrowest inter-word space across all the final text lines,
(vii) whenever it is determined that the widest intra-word space found in the final text line under consideration is not less than the width of the narrowest inter-word space across all the final text lines,
(viii) re-classifying the currently identified widest intra-word space found in the final text line under consideration as an inter-word space, and
(ix) identifying the intra-word space in the final text line under consideration that is currently the widest, and
(x) repeating actions b(vi) through b(ix) until it is determined the currently identified widest intra-word space found in the final text line is less than the width of the narrowest inter-word space across all the final text lines.

16. The process of claim 1, wherein an indentation space exists either at the left or right side of a text line to indicate the start of a new paragraph having a length of two or more text lines, and wherein the process action of segmenting the final text lines into paragraphs, comprises the actions of:
starting with the first final text line and proceeding in a downward vertical order, ascertaining if an indentation space exists either at the left or right side of the final text line under consideration which has a width exceeding a prescribed indentation threshold, wherein an indentation space comprises a set of consecutive columns preceding the leftmost final text word in the final text line under consideration if at the left side of that line, and a set of consecutive columns following the rightmost final text word in the final text line under consideration if at the right side of that line,
whenever no indentation space is found, designating the entire text region as a paragraph,
whenever one or more indentation spaces are found, identifying if the first indentation space found was on the left or right side of a final text line,
whenever the first indentation space found was on the left side of a final text line,
designating that the text flows from left to right,
designating text lines, if any, preceding the text line where the first indentation space was found as a paragraph,
for each text line where an indentation space was found on the left side of a final text line, collectively designating that line and the final text lines following that line, up to the next final text line, if any, where an indentation space was found on the left side, as a paragraph,
whenever the first indentation space found was on the right side of a final text line,
designating that the text flows from right to left,
designating text lines, if any, preceding the text line where the first indentation space was found as a paragraph,
for each text line where an indentation space was found on the right side of a final text line, collectively designating that line and the final text lines following that line, up to the next final text line, if any, where an indentation space was found on the right side, as a paragraph.

17. The process of claim 1, wherein the process action of, for each paragraph, flowing the final text words found therein so as to fit into said specified-width display area while maintaining the original sequential order, comprises the actions of:
for each paragraph,
initiating a specified reflow procedure;
whenever one or more final text words are moved from one final text line to the next final text line during the reflow procedure, aligning the final text word or words being moved with the final text words in the final text line receiving the word or words being moved, said aligning comprising, identifying the pixel row in the word or words being moved that exhibits the highest black pixel count among the pixel rows making up the final text line the word or words being moved come from, identifying the pixel row in the final text line receiving the word or words being moved that exhibits the highest black pixel count among the pixel rows making up that final text line, and vertically aligning the identified pixel row associated with the word or words being moved with the identified pixel row associated with the final text line receiving the word or words being moved.

18. A computer-implemented process for segmenting a binarized region of text from a document image in a script-agnostic manner, comprising:

using a computer to perform the following process actions:

segmenting the text region into candidate lines of text, said candidate lines of text comprising at least one line of text comprising substantially only accent or diacritic marks, or both;

merging candidate lines of text comprising substantially only accent or diacritic marks, or both, into the closest adjacent candidate text line;

designating each remaining candidate text lines as a final text line; and segmenting each final text line into text words.

19. The process of claim 18, further comprising an action of identifying inter-word punctuation and diacritic marks and merging each identified mark into the closest adjacent candidate text word.

20. A computer-implemented process for reflowing a binarized region of text comprising black pixels representing text and white pixels representing non-text areas from a document image into a specified-width display area on an electronic display without the need for information about the script employed for the text, comprising:

using a computer to perform the following process actions:

segmenting the text region into candidate lines of text;

removing the candidate designation from each candidate text line that is attributable to inter-line black pixel noise rather than to text;

merging candidate lines of text comprising substantially only accent or diacritic marks, or both, into the closest adjacent candidate text line;

designating each remaining candidate text line as a final text line;

segmenting each final text line into candidate text words;

removing the candidate designation from each candidate text word that is attributable to inter-word black pixel noise rather than text;

identifying inter-word punctuation and diacritic marks, if any, and merging each identified mark into the closest adjacent candidate text word;

designating final text words based on the remaining candidate text words;

segmenting the final text lines into paragraphs; and for each paragraph, reflowing the final text words found therein so as to fit into said specified-width display area while maintaining the original sequential order, wherein said reflowing comprises vertically aligning word or words being moved from one final text line to the next with the words associated with the final text line receiving the word or words being moved.

* * * * *